US012136223B2

(12) United States Patent
Yu et al.

(10) Patent No.: US 12,136,223 B2
(45) Date of Patent: Nov. 5, 2024

(54) ROBOTIC SYSTEM FOR OBJECT SIZE DETECTION

(71) Applicant: MUJIN, INC., Tokyo (JP)

(72) Inventors: Jinze Yu, Tokyo (JP); Yoshiki Kanemoto, Tokyo (JP); Jose Jeronimo Moreira Rodrigues, Tokyo (JP); Rosen Nikolaev Diankov, Tokyo (JP)

(73) Assignee: MUJIN, INC., Tokyo (JP)

( * ) Notice: Subject to any disclaimer, the term of this patent is extended or adjusted under 35 U.S.C. 154(b) by 352 days.

(21) Appl. No.: 17/746,524

(22) Filed: May 17, 2022

(65) Prior Publication Data

US 2022/0375097 A1 Nov. 24, 2022

Related U.S. Application Data

(60) Provisional application No. 63/189,743, filed on May 18, 2021.

(51) Int. Cl.
| | | |
|---|---|---|
| *G06T 7/13* | (2017.01) | |
| *B25J 9/16* | (2006.01) | |
| *G06T 1/00* | (2006.01) | |
| *G06T 7/60* | (2017.01) | |
| *G06K 15/02* | (2006.01) | |
| *G06V 10/44* | (2022.01) | |
| *H04N 1/409* | (2006.01) | |

(52) U.S. Cl.
CPC ............... *G06T 7/13* (2017.01); *B25J 9/1612* (2013.01); *B25J 9/1653* (2013.01); *B25J 9/1666* (2013.01); *B25J 9/1697* (2013.01); *G06T 1/0014* (2013.01); *G06T 7/60* (2013.01); *G06K 15/1871* (2013.01); *G06T 2200/12* (2013.01); *G06T 2207/20164* (2013.01); *G06V 10/44* (2022.01); *H04N 1/4092* (2013.01)

(58) Field of Classification Search
None
See application file for complete search history.

(56) References Cited

U.S. PATENT DOCUMENTS

| | | | |
|---|---|---|---|
| 11,145,063 B2 * | 10/2021 | Umegatani | ............. G06T 7/593 |
| 11,389,965 B2 | 7/2022 | Yu et al. | |
| 11,501,445 B2 | 11/2022 | Diankov et al. | |

(Continued)

FOREIGN PATENT DOCUMENTS

| | | |
|---|---|---|
| JP | 2021-22383 A | 2/2021 |
| JP | 2021-51797 A | 4/2021 |

OTHER PUBLICATIONS

Japanese Office Action issued in corresponding Japanese Application No. 2022-081405 dated Sep. 27, 2022.

*Primary Examiner* — Haris Sabah
(74) *Attorney, Agent, or Firm* — MEDLER FERRO WOODHOUSE & MILLS PLLC

(57) ABSTRACT

A computing system including a processing circuit in communication with a camera having a field of view. The processing circuit obtains image information based on the objects in the field of view and defines a minimum viable region for a target open corner. Potential minimum viable regions are defined by identifying candidate edges of an object and determining potential intersection points based on the candidate edges. The minimum viable region may then be identified and validated from the potential minimum viable regions.

20 Claims, 19 Drawing Sheets

(56) References Cited

U.S. PATENT DOCUMENTS

| | | | |
|---|---|---|---|
| 2004/0217260 A1* | 11/2004 | Bernardini | G06T 7/521 250/208.1 |
| 2013/0182002 A1* | 7/2013 | Macciola | G06V 10/25 345/589 |
| 2015/0130906 A1* | 5/2015 | Bridges | G06T 7/13 348/46 |
| 2020/0130961 A1* | 4/2020 | Diankov | G06T 7/73 |

* cited by examiner

System 1000

Computing System 1100

Camera 1200

FIG. 1A

System 1500

Computing System 1100

Camera 1200A  Camera 1200B

FIG. 1B

System 1500B

Computing System 1100

Camera 1200

Robot 1300

FIG. 1C

System 1500C

Computing System 1100

Non-transitory computer-readable medium 1400

Camera 1200

FIG. 1D

ROBOTIC SYSTEM FOR OBJECT SIZE DETECTION

CROSS-REFERENCE TO RELATED APPLICATION(S)

The present application claims the benefit of U.S. Provisional Appl. No. 63/189,743, entitled "A ROBOTIC SYSTEM FOR OBJECT SIZE MEASUREMENT OR MINIMUM VIABLE REGION DETECTION" and filed May 18, 2021, the entire content of which is incorporated by reference herein.

FIELD OF THE INVENTION

The present technology is directed generally to robotic systems and, more specifically, to systems, processes, and techniques for performing object size measurement and/or minimum viable region detection.

BACKGROUND

With their ever-increasing performance and lowering cost, many robots (e.g., machines configured to automatically/autonomously execute physical actions) are now extensively used in various different fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

BRIEF SUMMARY

According to an embodiment hereof, a computing system comprising a non-transitory computer-readable medium; at least one processing circuit in communication with a camera having a field of view and configured, when one or more objects are or have been in the field of view, to execute instructions stored on the non-transitory computer-readable medium is provided. The instructions are for: obtaining image information representing one or objects, each object having a plurality of edges, wherein the image information is generated by the camera and describes at least an object appearance associated with the one or more objects; detecting a plurality of corners of the one or more objects based on the image information; identifying a target open corner from the plurality of corners; defining a minimum viable region for the target open corner, wherein the minimum viable region is defined by: generating a plurality of candidate edge segments; determining a plurality of candidate edges from the plurality of candidate edge segments; defining a plurality of intersection points between respective ones of the plurality of candidate edges; defining a set of potential minimum viable region candidates based on the plurality of intersection points; and selecting a minimum viable region candidate for the target open corner of the plurality of corners from the set of potential minimum viable region candidates; and validating the minimum viable region candidate as a minimum viable region for the target open corner.

A further embodiment provides a method of controlling a robotic system comprising a non-transitory computer-readable medium, at least one processing circuit in communication with a camera having a field of view and configured to execute instructions. The method comprises obtaining image information representing one or objects, each object having a plurality of edges, wherein the image information is generated by the camera and describes at least an object appearance associated with the one or more objects; detecting a plurality of corners of the one or more objects based on the image information; identifying a target open corner from the plurality of corners; defining a minimum viable region for the target open corner, wherein the minimum viable region is defined by: generating a plurality of candidate edge segments; determining a plurality of candidate edges from the plurality of candidate edge segments; defining a plurality of intersection points between respective ones of the plurality of candidate edges; defining a set of potential minimum viable region candidates based on the plurality of intersection points; and selecting a minimum viable region candidate for the target open corner of the plurality of corners from the set of potential minimum viable region candidates; and validating the minimum viable region candidate as a minimum viable region for the target open corner.

In a further embodiment, a non-transitory computer-readable medium is provided. The non-transitory computer-readable medium includes instructions for execution by at least one processing circuit in communication with a camera having a field of view and configured, when one or more objects are or have been in the field of view, the instructions being configured for: obtaining image information representing one or objects, each object having a plurality of edges, wherein the image information is generated by the camera and describes at least an object appearance associated with the one or more objects; detecting a plurality of corners of the one or more objects based on the image information; identifying a target open corner from the plurality of corners; defining a minimum viable region for the target open corner, wherein the minimum viable region is defined by: generating a plurality of candidate edge segments; determining a plurality of candidate edges from the plurality of candidate edge segments; defining a plurality of intersection points between respective ones of the plurality of candidate edges; defining a set of potential minimum viable region candidates based on the plurality of intersection points; and selecting a minimum viable region candidate for the target open corner of the plurality of corners from the set of potential minimum viable region candidates; and validating the minimum viable region candidate as a minimum viable region for the target open corner.

BRIEF DESCRIPTION OF THE FIGURES

FIGS. 1A-1D illustrate systems for performing or facilitating defining a minimum viable region, consistent with embodiments hereof.

DETAILED DESCRIPTION

Figure 2A:
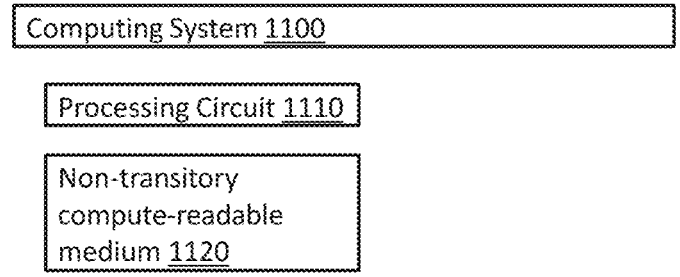
FIGS. 2A-2D provide block diagrams that illustrate a computing system configured to perform or facilitate defining a minimum viable region, consistent with embodiments hereof.

Systems and methods for a robotic system with a coordinated transfer mechanism are described herein. The robotic system (e.g., an integrated system of devices that each execute one or more designated tasks) configured in accordance with some embodiments autonomously executes integrated tasks by coordinating operations of multiple units (e.g., robots).

The technology described herein provides technical improvements to the existing computer-based image recognition and robotic control fields. Technical improvements provide an increase in overall speed and reliability of identifying gripping portions of objects to increase the efficiency and reliability of robotic interactions with the objects. Using image information to determine and differentiate objects present within a field of view of a camera, the process described herein further improves existing image recognition through the use of movement of the objects to adjust and assist in the identification of potential gripping portions of one target object.

In particular, the present technology described herein assists a robotic system to interact with a particular object among a plurality of object, when identification of the dimensions and positions of each object are unknown or known with incomplete accuracy. For example, if a plurality of objects are positioned flush with one another, existing computer-based image recognition may have difficulty in identifying each object and reliably and accurately instructing a robotic system on how to interact with the objects. In particular, if the dimensions of the objects are not accurately identified, it may not be clear to a robotic system where one object ends and another begins. Thus, the system risks attempting to grasp an object at a location where it intersects with other objects. In such a case, the system may fail to grasp either object. Although the exact dimensions of an object may not be known with complete accuracy, the systems and methods provided herein provide the ability to quickly and reliably identify at least a portion, e.g., a minimum viable region, of an object that may be grasped by the robot arm without the need to identify or determine the exact edges of the object. Further, the system may be configured to adjust a location at which an object is grabbed. If an object is grabbed at certain locations (e.g., off-center locations), transporting the object may be difficult. System and methods provided herein may use movement of the object after initial grasping by the robot arm to determine the exact dimensions of the object and adjust or alter how the robot interacts with the object based on the updated dimensions.

In the following, specific details are set forth to provide an understanding of the presently disclosed technology. In embodiments, the techniques introduced here may be practiced without including each specific detail disclosed herein. In other instances, well-known features, such as specific functions or routines, are not described in detail to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments. It is to be understood that the various embodiments shown in the figures are merely illustrative representations and are not necessarily drawn to scale.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments may have different configurations or different components than those described in this section. Accordingly, the disclosed techniques may have other embodiments with additional elements or without several of the elements described below.

Many embodiments or aspects of the present disclosure described below may take the form of computer- or controller-executable instructions, including routines executed by a programmable computer or controller. Those skilled in the relevant art will appreciate that the disclosed techniques can be practiced on or with computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices (including palmtop computers, wearable computers, cellular or mobile phones, multi-processor systems, processor-based or programmable consumer electronics, network computers, minicomputers, and the like). Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

Any reference herein to image analysis by a computing system may be performed according to or using spatial structure information that may include depth information which describes respective depth value of various locations relative a chosen point. The depth information may be used to identify objects or estimate how objects are spatially arranged. In some instances, the spatial structure information may include or may be used to generate a point cloud that describes locations of one or more surfaces of an object. Spatial structure information is merely one form of possible image analysis and other forms known by one skilled in the art may be used in accordance with the methods described herein.

FIG. 1A illustrates a system 1500 for performing object detection, or, more specifically, object recognition. More particularly, the system 1500 may include a computing system 1100 and a camera 1200. In this example, the camera 1200 may be configured to generate image information which describes or otherwise represents an environment in which the camera. 1200 is located, or, more specifically, represents an environment in the camera's 1200 field of view (also referred to as a camera field of view). The environment may be, e.g., a warehouse, a manufacturing plant, a retail space, or other premises. In such instances, the image information may represent objects located at such premises, such as boxes, bins, cases, crates, or other containers. The system 1500 may be configured to generate, receive, and/or process the image information, such as by using the image information to distinguish between individual objects in the camera field of view, to perform object recognition or object registration based on the image information, and/or perform robot interaction planning based on the image information, as discussed below in more detail (the terms "and/or" and "or" are used interchangeably in this disclosure). The robot interaction planning may be used to, e.g., control a robot at the premises to facilitate robot interaction between the robot and the containers or other objects. The computing system 1100 and the camera 1200 may be located at the same premises or may be located remotely from each other. For instance, the computing system 1100 may be part of a cloud computing platform hosted in a data center which is remote from the warehouse or retail space and may be communicating with the camera 1200 via a network connection.

In an embodiment, the camera 1200 (which may also be referred to as an image sensing device) may be a 2D camera and/or a 3D camera. For example, FIG. 1B illustrates a system 1500A (which may be an embodiment of the system 1500) that includes the computing system 1100 as well as a camera 1200A and a camera 1200B, both of which may be an embodiment of the camera 1200. In this example, the camera 1200A may be a 2D camera that is configured to generate 2D image information which includes or forms a 2D image that describes a visual appearance of the environment in the camera's field of view. The camera 1200B may be a 3D camera (also referred to as a spatial structure sensing camera or spatial structure sensing device) that is configured to generate 3D image information which includes or forms spatial structure information regarding an environment in the camera's field of view. The spatial structure information may include depth information (e.g., a depth map) which describes respective depth values of various locations relative to the camera 1200B, such as locations on surfaces of various objects in the camera 1200's field of view. These locations in the camera's field of view or on an object's surface may also be referred to as physical locations. The depth information in this example may be used to estimate how the objects are spatially arranged in three-dimensional (3D) space. In some instances, the spatial structure information may include or may be used to generate a point cloud that describes locations on one or more surfaces of an object in the camera 1200B's field of view. More specifically, the spatial structure information may describe various locations on a structure of the object (also referred to as an object structure).

In an embodiment, the system 1500 may be a robot operation system for facilitating robot interaction between a robot and various objects in the environment of the camera 1200. For example, FIG. 1C illustrates a robot operation system 1500B, which may be an embodiment of the system 1500/1500A of FIGS. 1A and 1B. The robot operation system 1500B may include the computing system 1100, the camera 1200, and a robot 1300. As stated above, the robot 1300 may be used to interact with one or more objects in the environment of the camera 1200, such as with boxes, crates, bins, or other containers. For example, the robot 1300 may be configured to pick up the containers from one location and move them to another location. In some cases, the robot 1300 may be used to perform a de-palletization operation in which a group of containers or other objects are unloaded and moved to, e.g., a conveyor belt. In some implementations, the camera. 1200 may be attached to the robot 1300, such as to a robot arm 3320 of the robot 1300. In some implementations, the camera 1200 may be separate from the robot 1300. For instance, the camera 1200 may be mounted to a ceiling of a warehouse or other structure and may remain stationary relative to the structure.

In an embodiment, the computing system 1100 of FIGS. 1A-1C may form or be integrated into the robot 1300, which may also be referred to as a robot controller. A robot control system may be included in the system 1500B, and is configured to e.g., generate commands for the robot 1300, such as a robot interaction movement command for controlling robot interaction between the robot 1300 and a container or other object. In such an embodiment, the computing system 1100 may be configured to generate such commands based on, e.g., image information generated by the camera 1200. For instance, the computing system 1100 may be configured to determine a motion plan based on the image information, wherein the motion plan may be intended for, e.g., gripping or otherwise picking up an object. The computing system 1100 may generate one or more robot interaction movement commands to execute the motion plan.

In an embodiment, the computing system 1100 may form or be part of a vision system. The vision system may be a system which generates, e.g., vision information which describes an environment in which the robot 1300 is located, or, alternatively or in addition to, describes an environment in which the camera 1200 is located. The vision information may include the 3D image information and/or the 2D image information discussed above, or some other image information. In some scenarios, if the computing system 1100 forms a vision system, the vision system may be part of the robot control system discussed above or may be separate from the robot control system. If the vision system is separate from the robot control system, the vision system may be configured to output information describing the environment in which the robot 1300 is located. The information may be outputted to the robot control system, which may receive such information from the vision system and performs motion planning and/or generates robot interaction movement commands based on the information. Further information regarding the vision system is detailed below.

In an embodiment, the computing system 1100 may communicate with the camera 1200 and/or with the robot 1300 via a direct connection, such as a connection provided via a dedicated wired communication interface, such as a RS-232 interface, a universal serial bus (USB) interface, and/or via a local computer bus, such as a peripheral component interconnect (PCI) bus. In an embodiment, the computing system 1100 may communicate with the camera 1200 and/or with the robot 1300 via a network. The network may be any type and/or form of network, such as a personal area network (PAN), a local-area network (LAN), e.g., Intranet, a metropolitan area network (MAN), a wide area network (WAN), or the Internet. The network may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol.

In an embodiment, the computing system 1100 may communicate information directly with the camera 1200 and/or with the robot 1300, or may communicate via an intermediate storage device, or more generally an intermediate non-transitory computer-readable medium. For example, FIG. 1D illustrates a system 1500C, which may be an embodiment of the system 1500/1500A/1500B, that includes a non-transitory computer-readable medium 1400, which may be external to the computing system 1100, and may act as an external buffer or repository for storing, e.g., image information generated by the camera 1200. In such an example, the computing system 1100 may retrieve or otherwise receive the image information from the non-transitory computer-readable medium 1400. Examples of the non-transitory computer readable medium 1400 include an electronic storage device, a magnetic storage device, an optical storage device, an electromagnetic storage device, a semiconductor storage device, or any suitable combination thereof. The non-transitory computer-readable medium may form, e.g., a computer diskette, a hard disk drive (HDD), a solid-state drive (SDI)), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), and/or a memory stick.

As stated above, the camera 1200 may be a 3D camera and/or a 2D camera. The 2D camera may be configured to generate a 2D image, such as a color image or a gray-scale image. The 3D camera may be, e.g., a depth-sensing camera, such as a time-of-flight (TOF) camera or a structured light camera, or any other type of 3D camera. In some cases, the 2D camera and/or 3D camera may include an image sensor, such as a charge coupled devices (CCDs) sensor and/or complementary metal oxide semiconductors (CMOS) sensor. In an embodiment, the 3D camera may include lasers, a LIDAR device, an infrared device, a light/dark sensor, a motion sensor, a microwave detector, an ultrasonic detector, a RADAR detector, or any other device configured to capture depth information or other spatial structure information.

As stated above, the image information may be processed by the computing system 1100. In an embodiment, the computing system 1100 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 1100 may be performed as part of a cloud computing platform. The computing system 1100 may be a single computing device (e.g., a desktop computer), or may include multiple computing devices.

FIG. 2A provides a block diagram that illustrates an embodiment of the computing system 1100. The computing system 1100 in this embodiment includes at least one processing circuit 1110 and a non-transitory computer-readable medium (or media) 1120. In some instances, the processing circuit 1110 may include processors (e.g., central processing units (CPUs), special-purpose computers, and/or onboard servers) configured to execute instructions (e.g., software instructions) stored on the non-transitory computer-readable medium 1120 (e.g., computer memory). In some embodiments, the processors may be included in a separate/stand-alone controller that is operably coupled to the other electronic/electrical devices. The processors may implement the program instructions to control/interface with other devices, thereby causing the computing system 1100 to execute actions, tasks, and/or operations. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit.

In an embodiment, the non-transitory computer-readable medium 1120, which is part of the computing system 1100, may be an alternative or addition to the intermediate non-transitory computer-readable medium 1400 discussed above. The non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof or any other storage device. In some instances, the non-transitory computer-readable medium 1120 may include multiple storage devices. In certain implementations, the non-transitory computer-readable medium 1120 is configured to store image information generated by the camera 1200 and received by the computing system 1100. In some instances, the non-transitory computer-readable medium 1120 may store one or more model templates used for performing an object recognition operation. The non-transitory computer-readable medium 1120 may alternatively or additionally store computer readable program instructions that, when executed by the processing circuit 1110, causes the processing circuit 1110 to perform one or more methodologies described here.

Figure 2B:
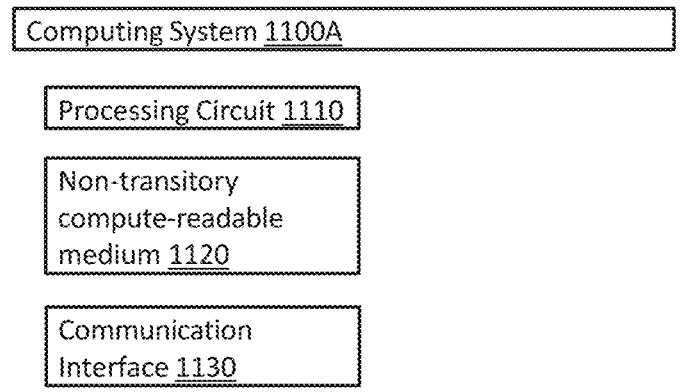

FIG. 2B depicts a computing system 1100A that is an embodiment of the computing system 1100 and includes a communication interface 1130. The communication interface 1130 may be configured to, e.g., receive image information generated by the camera 1200 of FIGS. 1A-1D, The image information may be received via the intermediate non-transitory computer-readable medium 1400 or the network discussed above, or via a more direct connection between the camera 1200 and the computing system 1100/1100A. In an embodiment, the communication interface 1130 may be configured to communicate with the robot 1300 of FIG. 1C. If the computing system 1100 is external to a robot control system, the communication interface 1130 of the computing system 1100 may be configured to communicate with the robot control system. The communication interface 1130 may also be referred to as a communication component or communication circuit, and may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
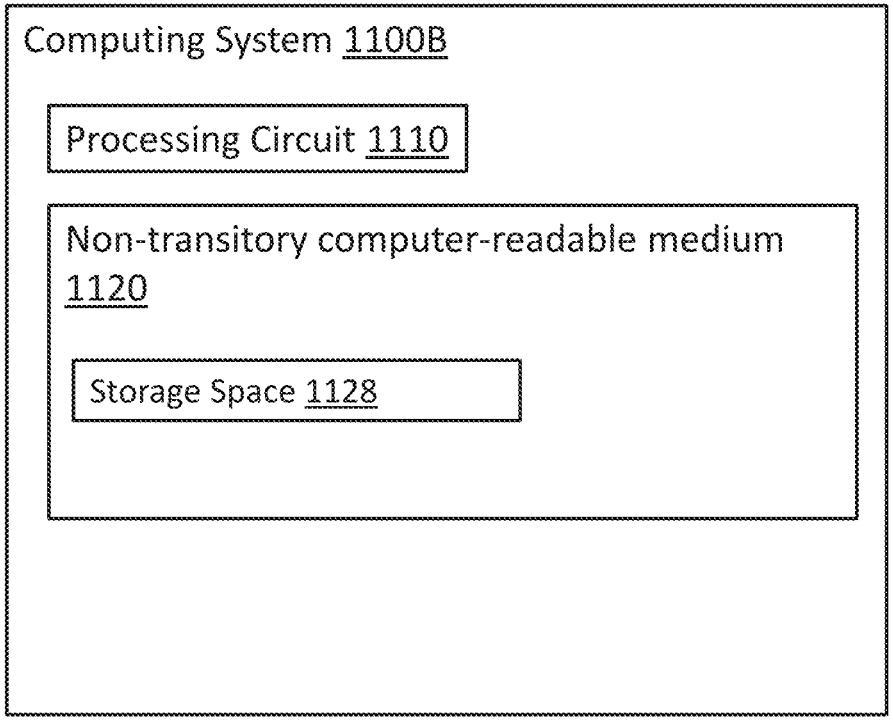

In an embodiment, as depicted in FIG. 2C, the non-transitory computer-readable medium 1120 may include a storage space 1128 configured to store one or more data objects discussed herein. For example, the storage space may store model templates, robotic arm move commands, and any additional data objects the computing system 1100B may require access to.

Figure 2D:
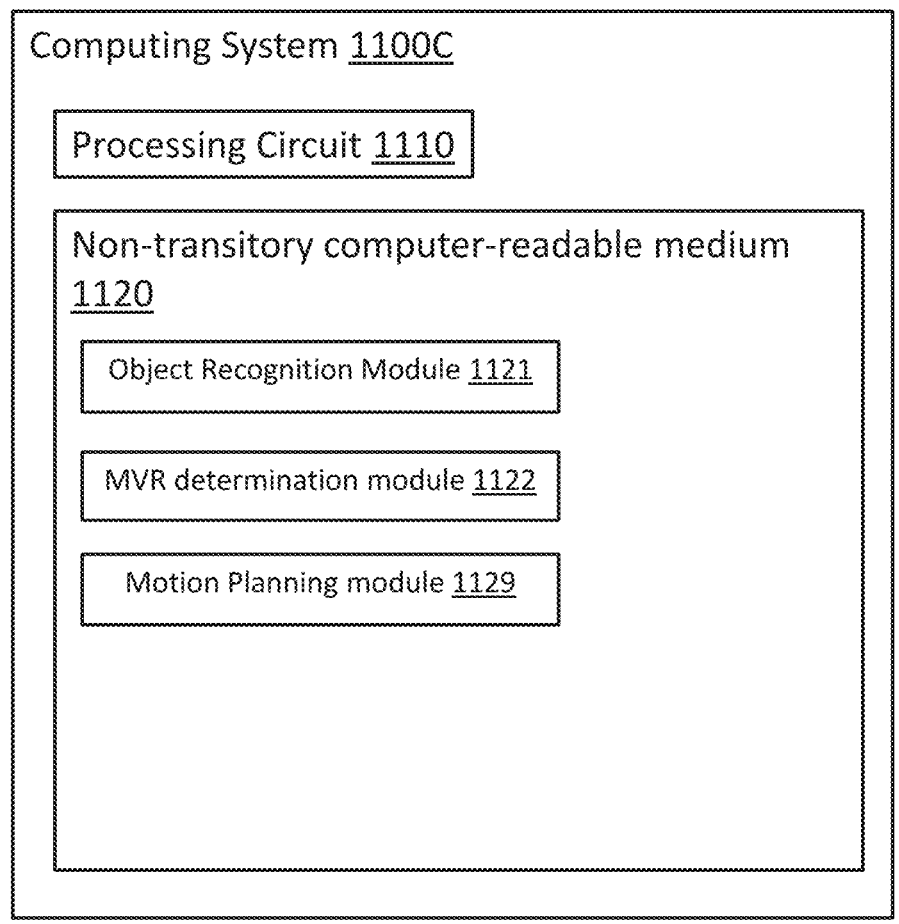

In an embodiment, the processing circuit 1110 may be programmed by one or more computer-readable program instructions stored on the non-transitory computer-readable medium 1120. For example, FIG. 2D illustrates a computing system 1100C, which is an embodiment of the computing system 1100/1100A/1100B, in which the processing circuit 1110 is programmed by one or more modules, including an object recognition module 1121, a minimum viable region (MVR) module 1122, and a motion planning module 1129.

In an embodiment, the object recognition module 1121 may be configured to obtain and analyze image information as discussed throughout the disclosure. Methods, systems, and techniques discussed herein with respect to image information may use the object recognition module.

The MVR determination module 1122 may be configured calculate, determine, and/or identify minimum viable regions according to image information and analysis performed or obtained by the object recognition module 1121. Methods, systems, and techniques discussed herein with respect to MVR determination may be performed by the MVR determination module 1122.

The motion planning module 1129 may be configured plan the movement of a robot. For example, the motion planning module 1129 may derive individual placement locations/orientations, calculate corresponding motion plans, or a combination thereof for grabbing and moving objects. Methods, systems, and techniques discussed herein with respect to robotic arm movements may be performed by the motion planning module 1129.

Figure 2E:
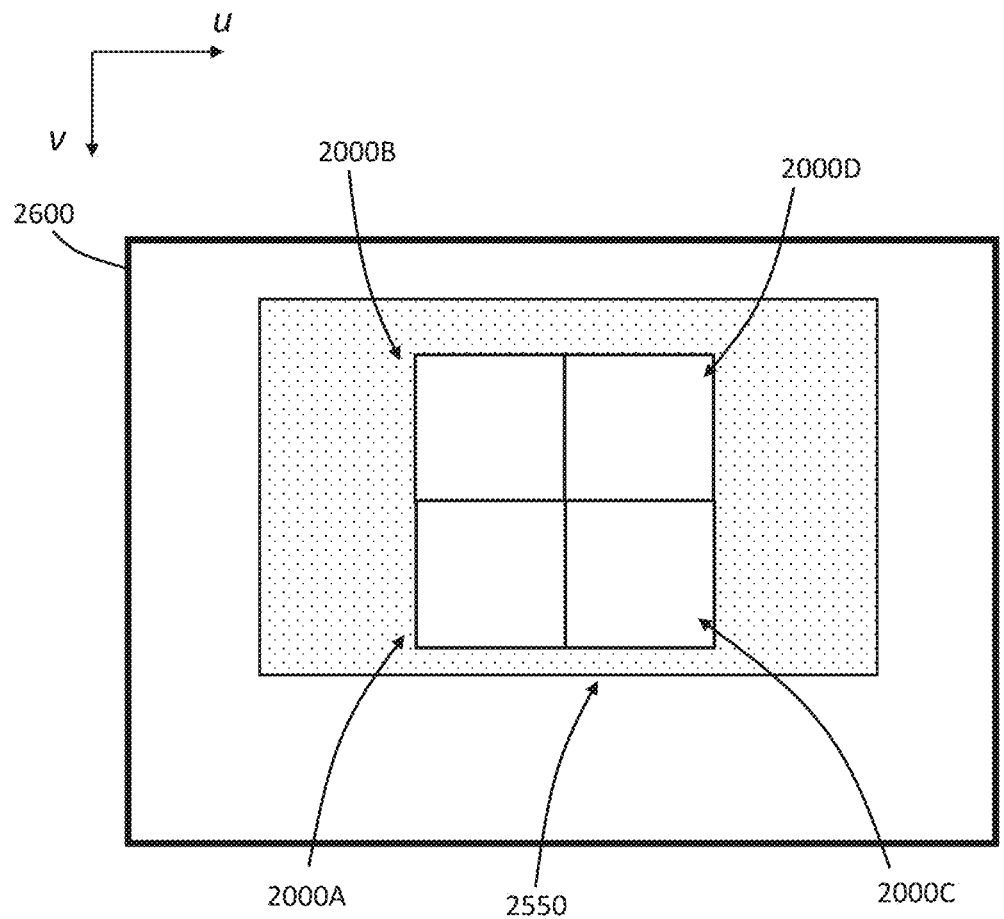
FIGS. 2E-2F provide examples of image information processed by systems and consistent with embodiments hereof.
Figure 2F:
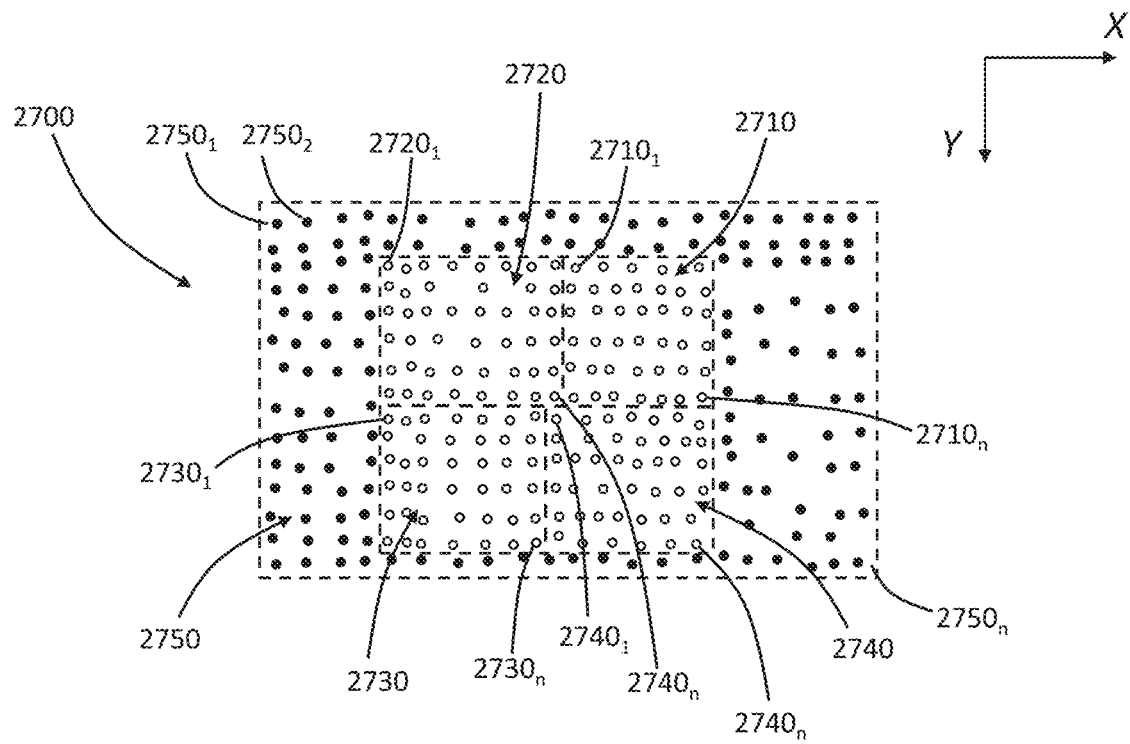
Figure 3A:
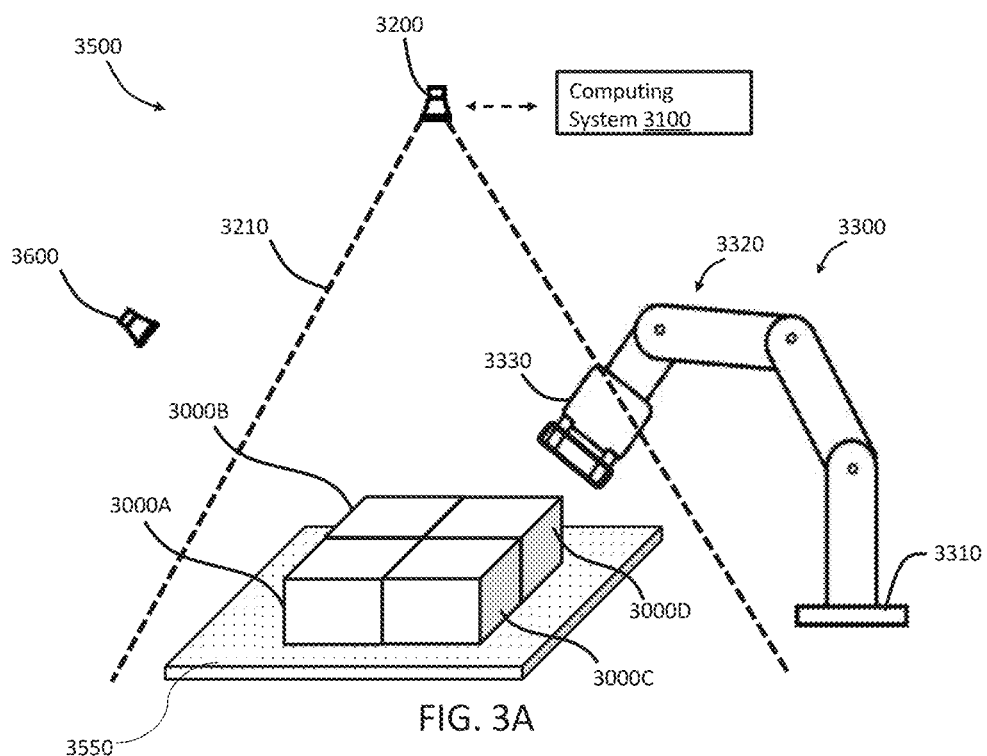
FIGS. 3A-3H illustrate environments in which defining a minimum viable region may be performed, according to embodiments hereof.

With reference to FIGS. 2E, 2F and 3A, methods related to the object recognition module 1121 that may be performed for image analysis are explained. FIGS. 2E and 2F illustrate example image information associated with image analysis methods while FIG. 3A illustrates an example robotic environment associated with image analysis methods. References herein related to image analysis by a computing system may be performed according to or using spatial structure information that may include depth information which describes respective depth value of various locations relative a chosen point. The depth information may be used to identify objects or estimate how objects are spatially arranged. In some instances, the spatial structure information may include or may be used to generate a point cloud that describes locations of one or more surfaces of an object. Spatial structure information is merely one form of possible image analysis and other forms known by one skilled in the art may be used in accordance with the methods described herein.

In embodiments, the computing system 1100 may obtain image information representing an object in a camera field of view (e.g., 3210) of a camera (e.g., 1200/3200). In some instances, the object may be a first object (e.g., 3510) of one or more objects (e.g., 3510-3540) in the camera field of view 3210 of a camera 1200/3200. The image information 2600, 2700 may be generated by the camera (e.g., 1200/3200) when the group of objects 3000A/3000B/3000C/3000D is (or has been) in the camera field of view 3210 and may describe one or more of the individual objects. The object appearance describes the appearance of an object 3000A/3000B/3000C/3000D from the viewpoint of the camera 1200/3200. If there are multiple objects in the camera field of view, the camera may generate image information that represents the multiple objects or a single object, as necessary. The image information may be generated by the camera (e.g., 1200/3200) when the group of objects is (or has been) in the camera field of view, and may include, e.g., 2D image information and/or 3D image information.

As an example, FIG. 2E depicts a first set of image information, or more specifically, 2D image information 2600, which, as stated above, is generated by the camera 3200 and represents the objects 3000A/3000B/3000C/3000D/3550 of FIG. 3A. More specifically, the 2D image information 2600 may be a grayscale or color image and may describe an appearance of the objects 3000A/3000B/3000C/3000D/3550 from a viewpoint of the camera 3200. In an embodiment, the 2D image information 2600 may correspond to a single-color channel (e.g., red, green, or blue color channel) of a color image. If the camera 3200 is disposed above the objects 3000A/3000B/3000C/3000D/3550, then the 2D image information 2600 may represent an appearance of respective top surfaces of the objects 3000A/3000B/3000C/3000D/3550. In the example of FIG. 2E, the 2D image information 2600 may include respective portions 2000A/2000B/2000C/2000D/2550, also referred to as image portions, that represent respective surfaces of the objects 3000A/3000B/3000C/3000D/3550. In FIG. 2E, each image portion 2000A/2000B/2000C/2000D/2550 of the 2D image information 2600 may be an image region, or more specifically a pixel region (if the image is formed by pixels). Each pixel in the pixel region of the 2D image information 2600 may be characterized as having a position that is described by a set of coordinates [U, V] and may have values that are relative to a camera coordinate system, or some other coordinate system, as shown in FIGS. 2E and 2F. Each of the pixels may also have an intensity value, such as a value between 0 and 255 or 0 and 1023. In further embodiments, each of the pixels may include any additional information associated with pixels in various formats (e.g., hue, saturation, intensity, CMYK, RGB, etc.)

As stated above, the image information may in some embodiments be all or a portion of an image, such as the 2D image information 2600. In examples, the computing system 3100 may be configured to extract an image portion 2000A from the 2D image information 2600 to obtain only the image information associated with a corresponding object 3000A. For instance, the computing system 3100 may extract the image portion 2000A by performing an image segmentation operation based on the 2D image information 2600 and/or 3D image information 2700 illustrated in FIG. 2F. In some implementations, the image segmentation operation may include detecting image locations at which physical edges of objects appear (e.g., edges of a box) in the 2D image information 2600 and using such image locations to identify an image portion (e.g., 5610) that is limited to representing an individual object in a camera field of view (e.g., 3210).

FIG. 2F depicts an example in which the image information is 3D image information 2700. More particularly, the 3D image information 2700 may include, e.g., a depth map or a point cloud that indicates respective depth values of various locations on one or more surfaces (e.g., top surface or other outer surface) of the objects 3000A/3000B/3000C/3000D/3550. In some implementations, an image segmentation operation for extracting image information may involve detecting image locations at which physical edges of objects appear (e.g., edges of a box) in the 3D image information 2700 and using such image locations to identify an image portion (e.g., 2730) that is limited to representing an individual object in a camera field of view (e.g., 3000A).

The respective depth values may be relative to the camera 3200 which generates the 3D image information 2700 or may be relative to some other reference point. In some embodiments, the 3D image information 2700 may include a point cloud which includes respective coordinates for various locations on structures of objects in the camera field of view (e.g., 3210). In the example of FIG. 2F, the point cloud may include respective sets of coordinates that describe the location of the respective surfaces of the objects 3000A/3000B/3000C/3000D/3550. The coordinates may be 3D coordinates, such as [X Y Z] coordinates, and may have values that are relative to a camera coordinate system, or some other coordinate system. For instance, the 3D image information 2700 may include a first portion 2710, also referred to as an image portion, that indicates respective depth values for a set of locations $2710_1$-$2710_n$, which are also referred to as physical locations on a surface of the object 3000D. Further, the 3D image information 2700 may further include a second, a third, and a fourth portion 2720, 2730, and 2740. These portions may then further indicate respective depth values for a set of locations, which may be represented by $2720_1$-$2720_n$, $2730_1$-$2730_n$, and $2740_1$-$2740_n$, respectively. These figures are merely examples, and any number of objects with corresponding image portions may be used. Similarly to as stated above, the 3D image information 2700 obtained may in some instances be a portion of a first set of 3D image information 2700 generated by the camera. In the example of FIG. 2E, if the 3D image information 2700 obtained represents a first object 3000A of FIG. 3A, then the 3D image information 2700 may be narrowed as to refer to only the image portion 2710.

In an embodiment, an image normalization operation may be performed by the computing system 1100 as part of obtaining the image information. The image normalization operation may involve transforming an image or an image portion generated by the camera 3200, so as to generate a transformed image or transformed image portion. For example, if the image information, which may include the 2D image information 2600, the 3D image information 2700, or a combination of the two, obtained may undergo an image normalization operation to attempt to cause the image information to be altered in viewpoint, object pose, lighting condition associated with the visual description information. Such normalizations may be performed to facilitate a more accurate comparison between the image information and model (e.g., template) information. The viewpoint may refer to a pose of an object relative to the camera 3200, and/or an angle at which the camera 3200 is viewing the object when the camera 3200 generates an image representing the object.

For example, the image information may be generated during an object recognition operation in which a target object is in the camera field of view 3210. The camera 3200 may generate image information that represents the target object when the target object has a specific pose relative to the camera. For instance, the target object may have a pose which causes its top surface to be perpendicular to an optical axis of the camera 3200. In such an example, the image information generated by the camera 3200 may represent a specific viewpoint, such as a top view of the target object. In some instances, when the camera 3200 is generating the image information during the object recognition operation, the image information may be generated with a particular lighting condition, such as a lighting intensity. In such instances, the image information may represent a particular lighting intensity, lighting color, or other lighting condition.

In an embodiment, the image normalization operation may involve adjusting an image or an image portion of a scene generated by the camera, so as to cause the image or image portion to better match a viewpoint and/or lighting condition associated with information of a model template. The adjustment may involve transforming the image or image portion to generate a transformed image which matches at least one of an object pose or a lighting condition associated with the visual description information of the model template.

The viewpoint adjustment may involve processing, warping, and/or shifting of the image of the scene so that the image represents the same viewpoint as the visual description information in the model template. Processing, for example, includes altering the color, contrast, or lighting of the image, warping of the scene may include changing the size, dimensions, or proportions of the image, and shifting of the image may include changing the position, orientation, or rotation of the image. In an example embodiment, processing, warping, and or/shifting may be used to alter an object in the image of the scene to have an orientation and/or a size which matches or better corresponds to the visual description information of the model template. If the model template describes a head-on view (e.g., top view) of some object, the image of the scene may be warped so as to also represent a head-on view of an object in the scene.

In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

One aspect of the present disclosure relates to a robotic system or any other computing system which is able to perform object detection (also referred to as object recognition), object size measurement, and/or minimum viable region detection. The object detection or size measurement may involve determining dimensions of an individual object in a scene or determining a boundary of the individual object. The object may be part of a group of objects, such as a box that is part of a group of objects. For instance, the robotic system may perform the object detection operation as part of a de-palletization operation in which the robotic system receives camera data which captures a scene having a pallet of objects, in which each layer of the pallet has objects placed close to each other.

Object detection in this scenario may involve processing or analyzing the camera data (image information) to distinguish among individual objects on a particular layer of the pallet, so as to be able to distinguish one individual object from other objects on the layer. The problem occurs when the pallet of objects are all positioned flush with one another, making it difficult for the robotic system to detect or separate the objects from one another. The process described herein may allow the robotic system to identify a size and/or boundary of the object, so as to generate a plan for picking up the individual object from the pallet and moving it elsewhere. In some implementations, the robotic system may identify at least one minimum viable region for the objects in a scene. The minimum viable region is an estimation of a potential outline, or dimensions, of the particular object. Therefore, the robotic system may grab an individual object at the minimum viable region with the end effector apparatus (e.g. gripper) without knowing the exact dimensions of the object. The minimum viable region of an object represents a region on the top surface of the object which is estimated to exist entirely on the surface of a single object. Accordingly, attempting to grasp an object within this region ensures that the end effector apparatus contacts only a single object without extending over the edge of the object. Minimum viable region determinations, as discussed herein, may increase the accuracy and speed of an object moving robot arm.

In the above example, the object may be, e.g., a box or other object placed next to other objects on a pallet or other platform. If a camera generates an image which captures a scene having the multiple objects, the image itself may not be completely reliable for purposes of distinguishing between the different objects. For instance, while some cameras may be able to generate an image that indicates depth values of various locations in a scene, if the multiple objects have the same height or are otherwise the same distance from the camera, the image may indicate substantially uniform depth values for a region covering the top surfaces of the multiple objects, especially if the multiple objects are closely packed together. Thus, such an image may provide limited information for purposes of identifying individual objects from among the multiple objects. While some cameras may be able to generate an image that captures a visual appearance of the objects, such as their top surfaces, these top surfaces may have lines or other visual markings printed on them. Thus, such an image may include lines, but each of the lines could be associated with a boundary of one of the objects (e.g., a first or second edge) or could be merely a visual marking (e.g., which could be a false edge). The systems and methods provide herein, therefore, may be used to determine a minimum viable region of an object surface. The minimum viable region represents a region on the top surface of the object which is estimated to exist entirely on the surface of a single object. The minimum viable region may be bordered by actual physical edges of an object and/or by false edges of the object. If the system is unable to easily distinguish between a false edge and a physical edge, this inability may be accounted for through the methods of defining a minimum viable region, as discussed below.

FIGS. 3A-3H illustrate an example environment in which the process and methods described herein may be performed. FIG. 3A depicts an environment having a system 3500 (which may be an embodiment of the system 1500/1500A/1500B/1500C of FIGS. 1A-1D) that includes the computing system 3100 (e.g., an embodiment of computing system 1100), a robot 3300, and a camera 3200. The camera 3200 may be an embodiment of the camera 1200 and may be configured to generate image information which represents a scene in a camera field of view 3210 of the camera 3200, or more specifically represents objects (such as boxes) in the camera field of view 3210, such as objects 3000A, 3000B, 3000C, and 3000D. In one example, each of the objects 3000A-3000D may be, e.g., a container such as a box or crate, while the object 3550 may be, e.g., a pallet on which the containers are disposed.

In an embodiment, the system 3500 of FIG. 3A may include one or more light sources, such as light source 3600. The light source 3600 may be, e.g., a light emitting diode (LED), a halogen lamp, or any other light source, and may be configured to emit visible light, infrared radiation, or any other form of light toward surfaces of the objects 3000A-3000D. In some implementations, the computing system 3100 may be configured to communicate with the light source 3600 to control when the light source 3600 is activated. In other implementations, the light source 3600 may operate independently of the computing system 3100.

In an embodiment, the system 3500 may include a camera 3200 or multiple cameras 3200, including a 2D camera that is configured to generate 2D image information 2600 and a 3D camera that is configured to generate 3D image information 2700. The 2D image information 2600 (e.g., a color image or a grayscale image) may describe an appearance of one or more objects, such as the objects 3000A/3000B/3000C/3000D, in the camera field of view 3210. For instance, the 2D image information 2600 may capture or otherwise represent visual detail disposed on respective outer surfaces (e.g., top surfaces) of the objects 3000A/3000B/3000C/3000D, and/or contours of those outer surfaces. In an embodiment, the 3D image information 2700 may describe a structure of one or more of the objects 3000A/3000B/3000C/3000D/3550, wherein the structure for an object may also be referred to as an object structure or physical structure for the object. For example, the 3D image information 2700 may include a depth map, or more generally include depth information, which may describe respective depth values of various locations in the camera field of view 3210 relative to the camera 3200 or relative to some other reference point. The locations corresponding to the respective depth values may be locations (also referred to as physical locations) on various surfaces in the camera field of view 3210, such as locations on respective top surfaces of the objects 3000A/3000B/3000C/3000D/3550. In some instances, the 3D image information 2700 may include a point cloud, which may include a plurality of 3D coordinates that describe various locations on one or more outer surfaces of the objects 3000A/3000B/3000C/3000D/3550, or of some other objects in the camera field of view 3210. The point cloud is shown in FIG. 2F.

In the example of FIG. 3A, the robot 3300 (which may be an embodiment of the robot 1300) may include a robot arm 3320 having one end attached to a robot base 3310 and having another end that is attached to or is formed by an end effector apparatus 3330, such as a robot gripper. The robot base 3310 may be used for mounting the robot arm 3320, while the robot arm 3320, or more specifically the end effector apparatus 3330, may be used to interact with one or more objects in an environment of the robot 3300. The interaction (also referred to as robot interaction) may include, e.g., gripping or otherwise picking up at least one of the objects 3000A-3000D. For example, the robot interaction may be part of a de-palletization operation in which the robot 3300 is used to pick-up the objects 3000A-3000D from the pallet and move the objects 3000A-3000D to a destination location. The end effector apparatus 3330 may have suction cups or other components for grasping or grabbing the object. The end effector apparatus 3330 may be configured, using a suction cup or other grasping component, to grasp or grab an object through contact with a single face or surface of the object, for example, via a top face.

The robot 3300 may further include additional sensors configured to obtain information used to implement the tasks, such as for manipulating the structural members and/or for transporting the robotic units. The sensors can include devices configured to detect or measure one or more physical properties of the robot 3300 (e.g., a state, a condition, and/or a location of one or more structural members/joints thereof) and/or of a surrounding environment. Some examples of the sensors can include accelerometers, gyroscopes, force sensors, strain gauges, tactile sensors, torque sensors, position encoders, etc.

Figure 3B:
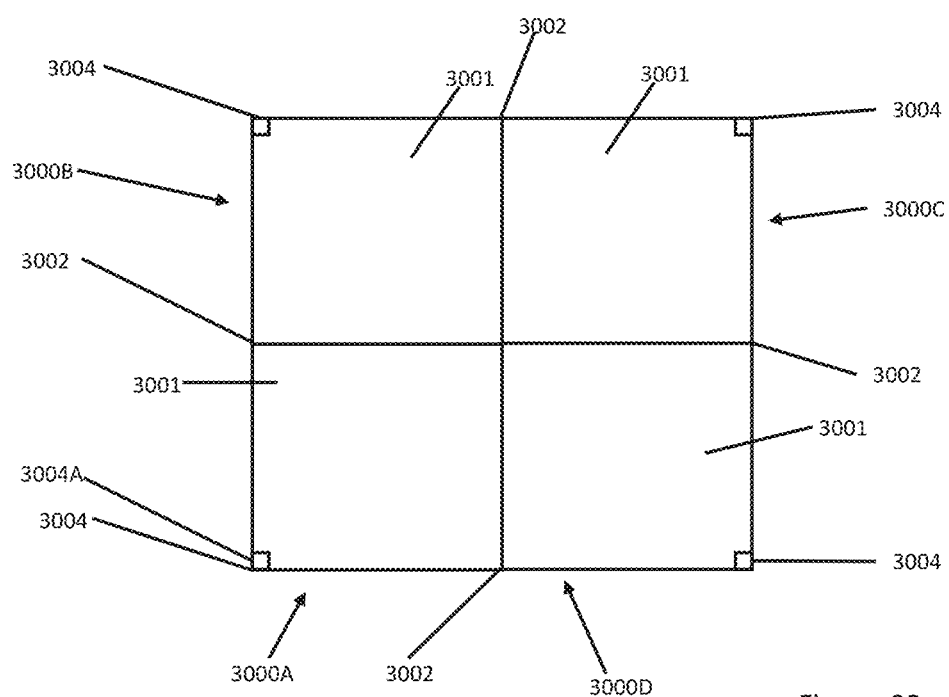
Figure 3C:
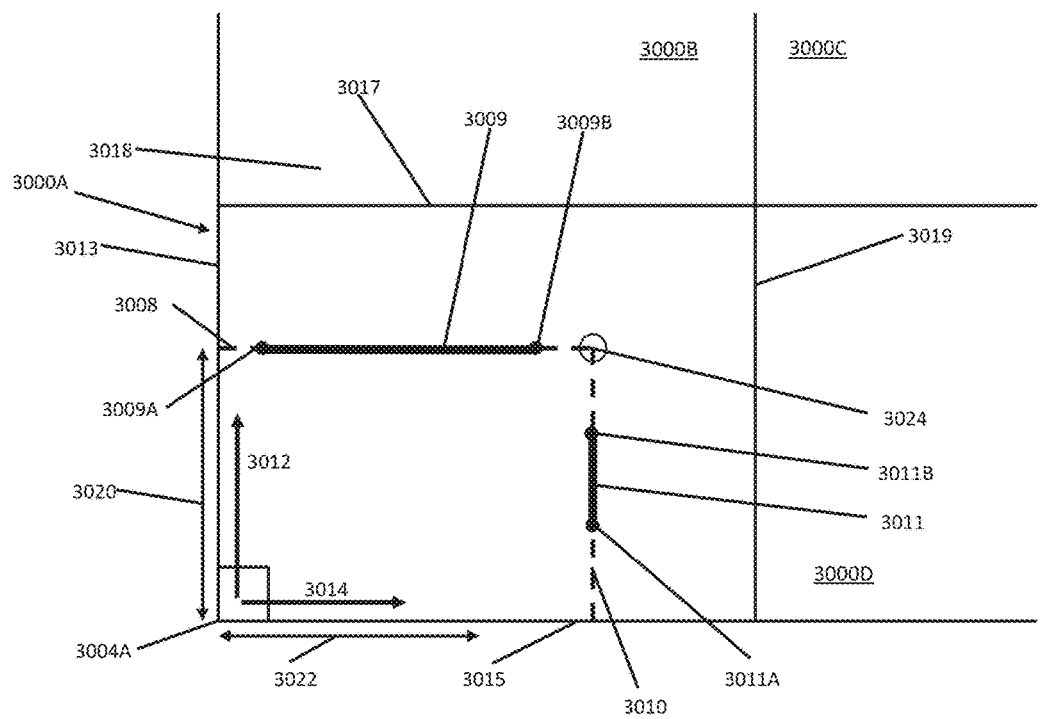

FIG. 3B depicts a top view of the objects 3000A, 3000B, 3000C, and 3000D of FIG. 3A. Each object 3000A-3000D includes a surface 3001, a plurality of corners 3002, and, in this example, an open corner 3004. As used herein, "open corner" refers to any corner of the plurality of corners 3002 that is not adjacent to another object 3000. An open corner may be formed by the two edges of the top surface of an object that do not themselves border another object. In an example, the two edges may include two horizontal edges. It is not required that the entirety of the two edges be free of adjacent objects for a corner to be considered open. Referring to FIG. 3C, which depicts a close-up top view of objects 3000A-3000D, additional features of each object 3000A-3000D are depicted. In a two-dimensional depiction, the object 3000A may have a surface defined by four edges, a lengthwise physical edge 3013, a widthwise physical edge 3015, a widthwise physical edge 3017, and a lengthwise physical edge 3019. In the example embodiment shown, the widthwise physical edge 3015 and the lengthwise physical edge 3013 are not adjacent to or flush with edges of any adjacent objects and thus may be referred to as open edges. In the example embodiment shown, the widthwise physical edge 3017 and the lengthwise physical edge 3019 are adjacent to and flush with, the edges of the adjacent objects 3000B and 3000D and thus may be referred to as closed edges. The use of the terms "lengthwise" and "widthwise" to refer to the edges described above does not imply that a specific orientation of the objects and/or edges is required. In general, for approximately rectangular objects, lengthwise edges are adjacent to (and approximately perpendicular to) widthwise edges. Lengthwise and widthwise, as used herein, refer only to specific directions within the context of an object or group of objects, and not to specific absolute directions. The positioning of the objects 3000A, 3000B, and 3000D may make it more difficult for the computing system 3100 to differentiate the features of each object.

Figure 4:
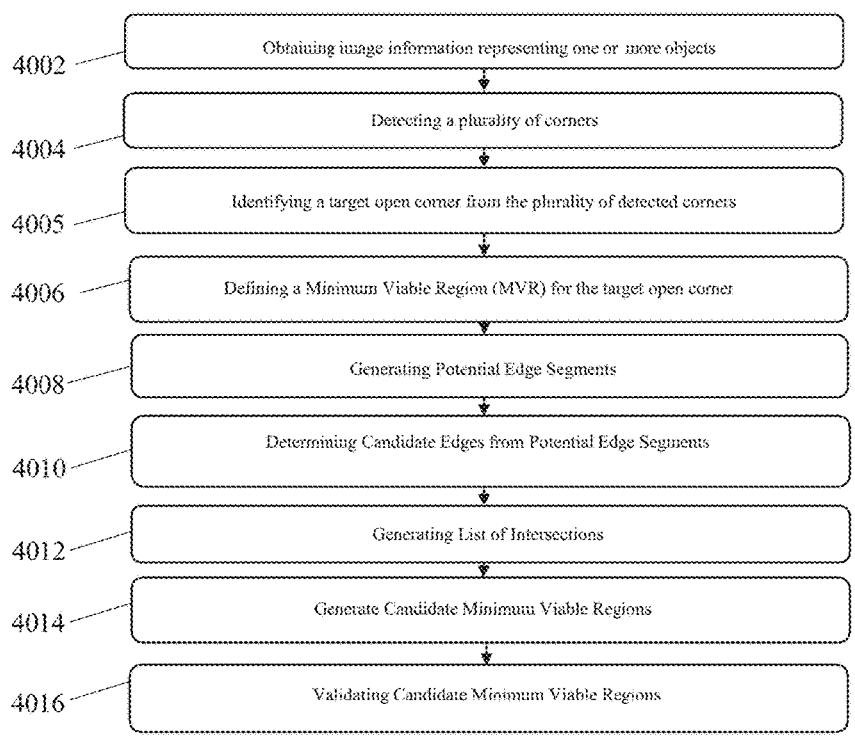
FIG. 4 provides a flow diagram that illustrates a method of defining a minimum viable region, according to an embodiment hereof.

A method 4000 for determining and a minimum viable region for an open corner 3004 is depicted in FIG. 4. The method 4000 may be stored on a non-transitory computer readable medium and may be executed by at least one processing circuit, with the at least one processing circuit being in communication with a camera having a field of view.

In an operation, the method 4000 includes an operation 4002 of obtaining image information representing the physical characteristics of one or more objects 3000, for example objects 3000A-3000D. The image information is generated by the camera 3200 and describes at least an object appearance associated with one or more objects, with each object including a plurality of edges. FIG. 3A depicts obtaining or generating the image information. In embodiments, the image information is obtained in a three-dimensional or perspective view, and, to increase the accuracy of the method, the viewpoint is shifted to a two-dimensional view. The viewpoint adjustment may involve processing, warping, and/or shifting of the image information, Processing may include altering the color, contrast, or lighting of the image information, warping of the scene may include changing the size, dimensions, or proportions of the image information, and shifting of the image information may include changing the position, orientation, or rotation of the image information. Warping may involve determining a homography which defines a warping transformation that transforms the image information from depicting an object in three-dimensions to depicting the object in two dimensions, for example a top view. In some instances, the warping may describe a rotation and/or a translation that matches the image information with corresponding points of a desired two-dimensional view, for example corners.

In embodiments, the computations and methods described below may be carried out after the camera is no longer imaging the object or objects, or after the object or objects have left the field of view.

In an operation, the method 4000 includes an operation 4004 for detecting a plurality of corners 3002 of the plurality of objects 3000 based on image information. To detect any corners present, the computing system 1100/3100 may use a variety of methods. For example, corner detection may involve edge detection and subsequent determination of edge intersection. Edge detection may be performed based on analysis of 2D and 3D image information, e.g., point cloud information. Edge detection may include, for example, (i) 2D image analysis to identify lines or edges within the 2D image that may represent boundaries between objects, (ii) point cloud analysis involving layer segmentation and detection of different heights/depths to detect edges, or (iii) 2D or 3D image analysis to identify open edges. The examples described herein are by way of example only and edge detection may further include alternative techniques as appropriate.

Edge detection may include, for example, 2D image analysis to identify lines or edges within the 2D image that may represent boundaries between objects. Such analysis may identify visual discontinuities within the 2D image that may represent edges. For example, such analysis may include, for example, analysis of pixel intensity discontinuity conditions or spiked pixel intensity conditions. Satisfying a defined pixel intensity discontinuity condition may include using changes in pixel intensity values, or more specifically, a derivative or gradient in pixel intensity values between regions having varying pixel intensities. The gradient or derivative may then be used to detect a spike in pixel intensity that is present at an edge or corner, particularly when moving perpendicular to the edge or corner. Additionally, the computing system 1100/3100 may apply a binary threshold to identify differences in pixel intensity, so as to define a spike or discontinuity between adjacent pixels, identifying an edges and corner.

Edge detection may include, for example, point cloud analysis involving layer segmentation and detection of different heights/depths to detect edges. Adjacent objects may have differing heights. Accordingly, the detection of different heights (or depths) in a point cloud (3D image information) may be used to detect edges between objects. Accordingly, the computing system 1100/3100 may detect edges according to portions of a point cloud that satisfy a defined depth discontinuity condition.

In further examples, edge detection may be performed by detecting physical edges that lack adjacent objects. Where objects lack adjacent objects, for example, where objects are located on an outside perimeter of a group of objects, the edges of the group of objects may be detected as physical edges of associated individual objects.

In embodiments, any of the above discussed methods for edge detection may be combined with each or with other edge detection methods to increase the accuracy or reliability of edge detection.

In an operation, the method 4000 includes an operation 4005 identifying an open corner 3004 from the plurality of corners 3002. As discussed above, "open corner" refers to a corner of the plurality of corners 3002 that is not adjacent to another object 3000. In embodiments, the system may be configured to identify the plurality of corners, and once the corners 3002 are identified, to choose the open corner, such as open corner 3004A, from open corners among the corners 3002. In embodiments, each of the plurality of corners 3002 may be an open corner, because the corner detection operation 4004 may detect corners based on physical edges identified by a lack of adjacent objects. Further, when identifying the target open corner, the system may recognize that the open corner is not adjacent to another object. The open corner 3004A may be a single target open corner.

Open corners (also referred to as convex or exterior corners), may be identified through analysis of 3D image information, for example in the form of the point cloud, as discussed above. Open corners may be identified, for example, by identifying vertices within the point cloud (e.g., based on edge intersection or other means) and then subjecting the identified vertices to one or more criteria (e.g., length, depth, width, orthogonality criteria) to determine whether they represent open corners. Further details regarding the use of image information to identify corners and potential edges may be found in U.S. Pat. No. 10,614,340, issued Apr. 7, 2020, which is incorporated by reference in its entirety.

As noted above and referring to FIG. 3C, which depicts an expanded top view of objects 3000A-3000D, additional features of each object 3000A-3000D are depicted. In a two-dimensional depiction, the object 3000A may have a surface defined by four edges, the lengthwise physical edge 3013, the widthwise physical edge 3015, the widthwise physical edge 3017, and the lengthwise physical edge 3019. In the example embodiment shown, the widthwise physical edge 3017 and the lengthwise physical edge 3019 are adjacent to and flush with, the edges of the adjacent objects 3000B and 3000D. As stated previously, such positioning of the objects 3000A, 3000B, and 3000D may make it more difficult for the computing system 3100 to differentiate the features of each object.

Figure 3D:
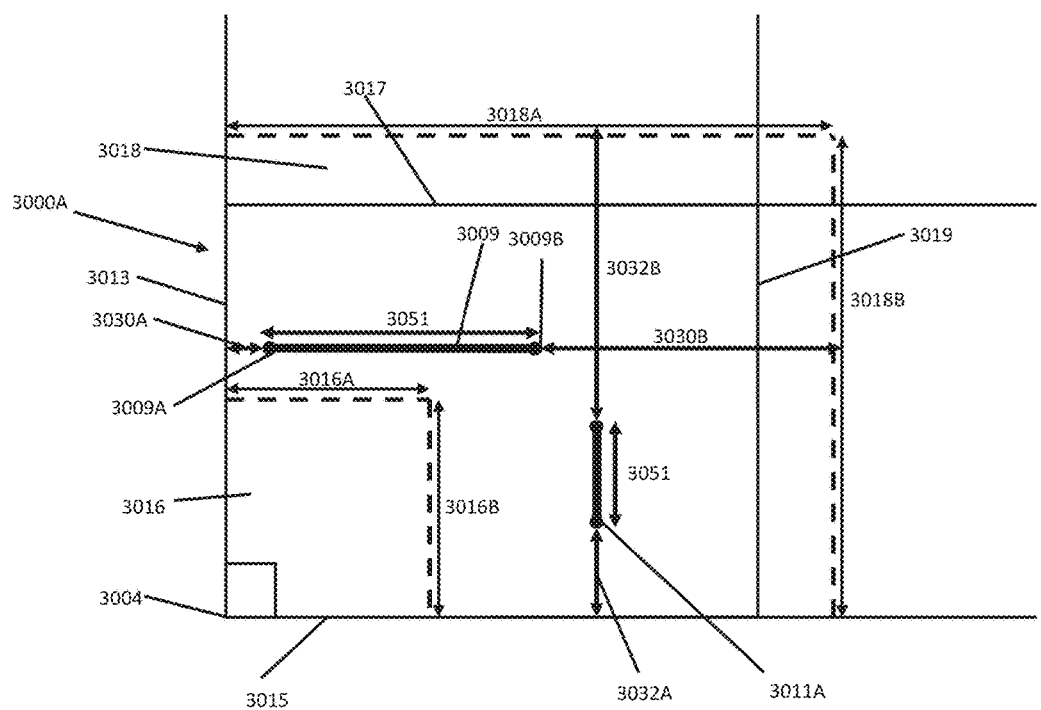
Figure 3E:
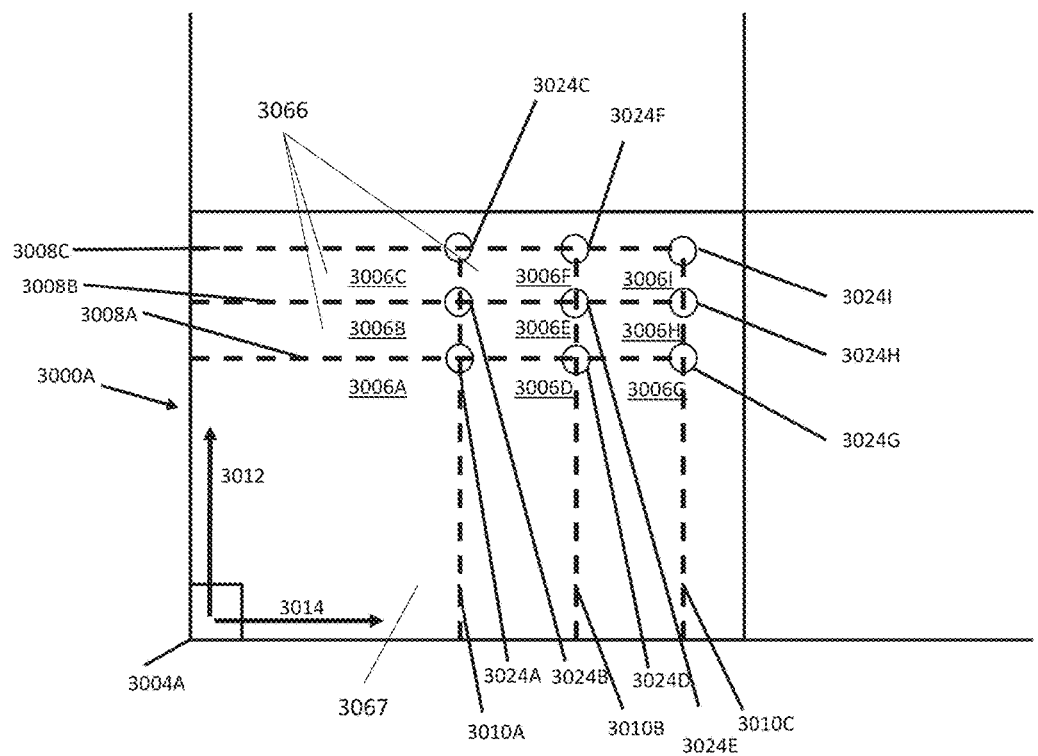
Figure 3F:
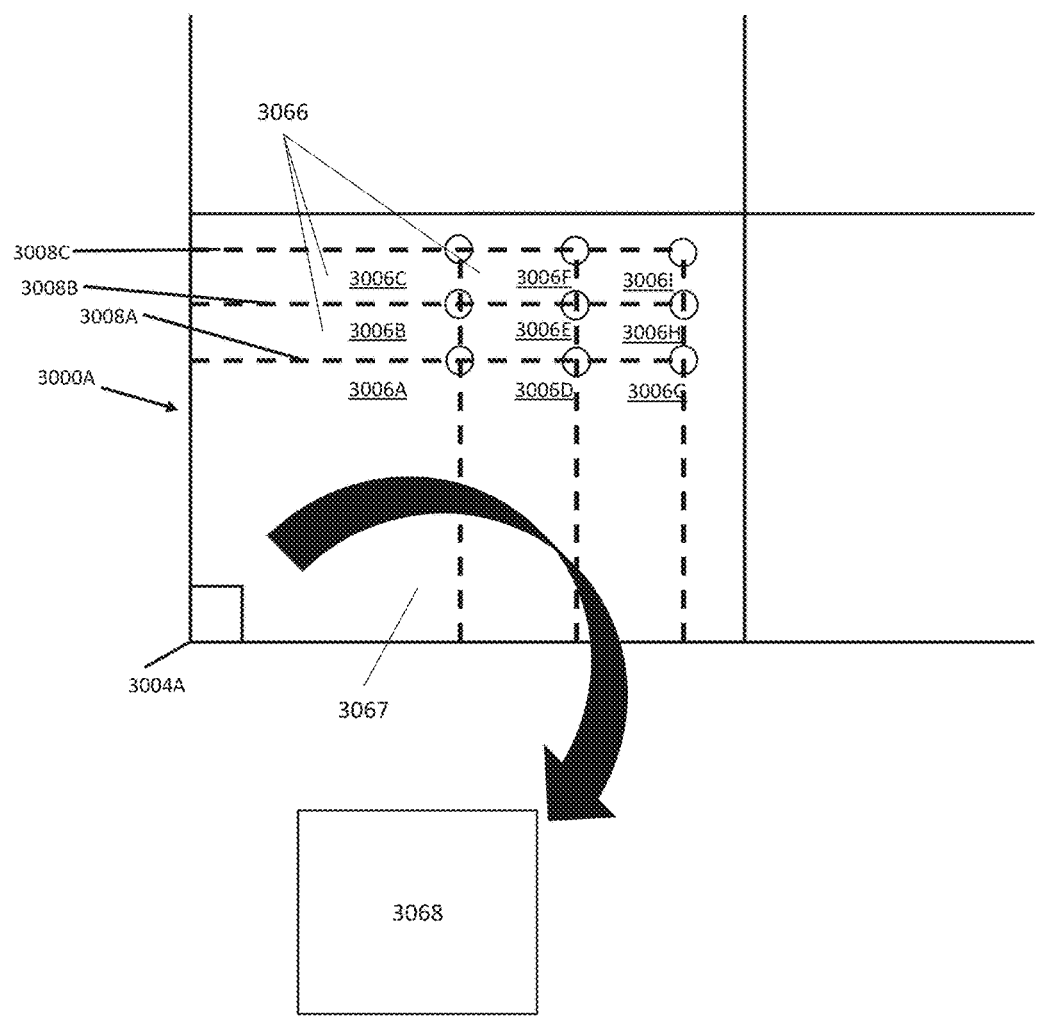
Figure 3G:
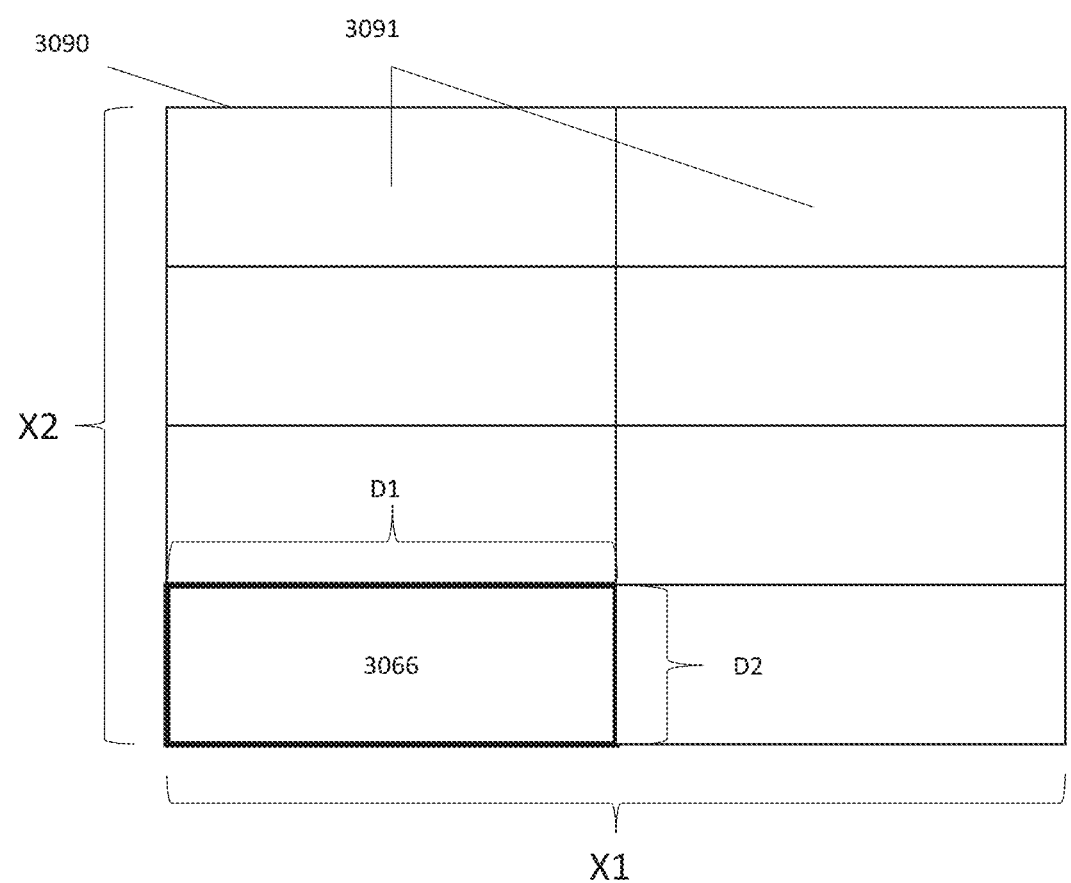

In an operation, the method 4000 includes an operation 4006 defining a minimum viable region 3006, as illustrated in FIGS. 3E and 3G, for the open corner 3004A. The minimum viable region 3006 represents a region on the surface 3001 of the object 3000 associated with the open corner 3004A that may be grabbed by the end effector apparatus 3330 of the robot arm 3320 to move the object 3000. As discussed above, the robot arm 3320 may use, for example, a suction grip of the end effector apparatus 3330 to grasp an object, such as the target object that includes the open corner 3004A, by the top surface. The minimum viable region 3006 of an object represents a region on the top surface of the object which is estimated to exist entirely on the surface of a single object. Accordingly, attempting to grasp the target object within the region defined by the minimum viable region 3006 may ensures that the end effector apparatus 3330 contacts only the target object (e.g., a single object) without extending over the edge of the target object such that adjacent objects are not also grasped when grasping the target object. In situations where edges of the object 3000 are adjacent to or in contact with other objects, the computing system 1100/3100 may have difficulty identifying or take longer to identify exact dimensions of the object. Therefore, it may be difficult to accurately define a region where the robot arm 3320 may securely grab the object 3000 without extending over an edge of the object 3000 and/or contacting another, separate, object. Thus, the minimum viable region 3006 defines a region based on estimated or potential dimensions where the robot arm 3320 may grab the object 3000 without knowing exact dimensions of the object 3000. The minimum viable region 3006 is intended to define a region in which the robot arm 3320 may grab an object 3000. It is understood that the size of the minimum viable region 3006 may be different, sometimes significantly different, than the size of the object 3000 on which it is found. Operations 4008-4016 depict how the minimum viable region 3006 may be calculated and validated.

In an operation, the method 4000 includes an operation 4008 for generating a plurality of candidate edge segments. The plurality of candidate edge segments may include a plurality of widthwise candidate edge segments and a plurality of lengthwise candidate edge segments. The plurality of widthwise candidate edge segments and plurality of lengthwise candidate edge segments represent edges or portions of edges that are candidates for corresponding to the widthwise physical edge 3017 and the lengthwise physical edge 3019, respectively, of the object 3000 associated with the open corner 3004A. The object 3000 associated with the open corner 3004A may be positioned adjacent or flush with other objects 3000, creating a circumstance where the computing system 1100/3100 may be challenged in differentiating where the object 3000A ends and other objects (3000B, 3000C, 300D, etc.) begin.

The computing system 1100/3100 may first identify a plurality of potential edge segments within the 2D image information. The potential edge segments may be identified from any type of detectable visual marking having properties that make it a possibility for being recognized as representing a physical edge of the object. For example, visual markings may include edges, creases, gaps, changes in coloration, and other discontinuities. The potential edge segments may then be further processed, for example, through clustering techniques, to identify a plurality of candidate edge segments. Appropriate clustering techniques are described, for example, in U.S. patent application Ser. No. 16/791,024, filed Feb. 14, 2020, which is incorporated herein by reference in its entirety. In an embodiment, candidate edge segments may be identified from potential edge segments based on being substantially perpendicular (e.g., within 5 degrees of perpendicular) to either the widthwise physical edge 3017 (for lengthwise candidate edge segments) or the lengthwise physical edge 3013 (for widthwise candidate edge segments). FIG. 3C illustrates an individual widthwise candidate edge segment 3009 of the plurality of widthwise candidate edge segments and an individual lengthwise candidate edge segment 3011 of the plurality of lengthwise candidate edge segments for example purposes.

In embodiments, the detection of the plurality of candidate edge segments may be limited according to minimum and maximum candidate sizes. The computing system 1100/3100 may determine minimum and maximum candidate sizes based on expected object sizes. Expected objects may have length, width, and height dimensions. A minimum candidate size may be defined according to the smallest face (e.g., according to two of the three dimension) to be found in the expected objects. In some embodiments, a minimum candidate size may be defined by length and width dimensions and/or by a diagonal dimension. A maximum candidate size may be defined according to the largest face (e.g. according to two of the three dimensions) to be found in the expected objects. A minimum candidate size 3016 and a maximum candidate size 3018 are illustrated, by way of example, in FIG. 3D. A minimum candidate size 3016 may thus be associated with the smallest possible object face and a maximum candidate size 3018 may thus be associated with a largest possible object face. The minimum candidate size 3016 may include a widthwise dimension 3016A and lengthwise dimension 3016B which represent the dimensions of the smallest possible object face, while the maximum candidate size 3018 may include a widthwise dimension 3018A and a lengthwise dimension 3018B which represent the dimensions of the largest possible object face. In some embodiments, only the region between the minimum candidate size 3016 and the maximum candidate size 3018 is analyzed for the generation of potential edge segments.

In embodiments, the operation 4008 may operate to combine aligned candidate edge segments. For example, where one or more candidate edge segments are aligned, they may be combined by the computing system 3010 for further analysis. Aligned candidate edge segments may have substantial co-linearity (also referred to as substantially similar alignment), which may be defined according to a predefined angle threshold and/or a predetermined offset threshold. The angle threshold for two candidate edge segments may require, e.g., that an angle between the two candidate edges be within the angle threshold (e.g., a certain number of degrees, such as 5°, 4°, 3°, 2°, or 1°), or that the respective angles formed by each of the two candidate edge segments be within the angle threshold. The offset threshold for two candidate edge segments may require, e.g., that the candidate edges have a smaller offset than an offset threshold. In an embodiment, an offset between two candidate edges may be defined by a shortest distance between respective lines extending or otherwise extrapolated from the candidate edges. Aligned candidate edge segments may be combined to create larger candidate edge segments.

In an operation, the method 4000 includes an operation 4010 of determining a plurality of candidate edges from a plurality of candidate edge segments. Referring now to FIGS. 3C and 3D, the operation of selecting candidate edges from the plurality of candidate edge segments is described. A series of thresholds or filters may be applied to eliminate candidate edge segments that are less likely, unlikely, or incapable of representing physical edges of the object under analysis. The operation 4010 may determine a plurality of candidate edges, including a plurality of widthwise candidate edges (represented in FIG. 3C by the individual widthwise candidate edge 3008) and a plurality of lengthwise candidate edges (represented in FIG. 3C by the individual lengthwise candidate edge 3010) as estimations of the widthwise physical edge 3017 and the lengthwise physical edge 3019. The operation 4010 may select candidate edges according to the application of one or more criteria.

A first threshold or criterion may be a position criterion or a physical edge to segment threshold. The position criterion represents an evaluation of whether or not a candidate edge segment falls within a threshold distance of a known open physical edge, and more specifically, a known open physical edge oriented substantially perpendicular to the candidate edge segment. FIG. 3C illustrates the widthwise candidate edge segment 3009, having a proximal endpoint 3009A and a distal endpoint 3009B, and positioned substantially perpendicular to the lengthwise physical edge vector 3012 corresponding to the lengthwise physical edge 3013, which is one of the open physical edges. The proximal end point 3009A is positioned at a proximal end of the widthwise candidate edge segment 3009 with respect to the lengthwise physical edge 3013 and the distal end point 3009B is positioned at a distal end of the widthwise candidate edge segment 3009 with respect to the lengthwise physical edge 3013. The position criterion represents an evaluation of whether the segment to edge distance 3030A between the proximal end point 3009A and the lengthwise physical edge 3013 is within a defined minimum value. The defined minimum value may be set as the length of the minimum dimension (Min) of the minimum candidate size 3016 weighted by a scaling factor $\delta_1$. Accordingly, the position criterion may be expressed as 0≤distance 3030A≤$\delta_1$*Min. The scaling factor $\delta_1$ may be set as a value between 0.4 and 0.6 or between 0.4 and 0.5. The position criterion assures that the proximal end point 3009A of the widthwise candidate edge segment 3009 is not spaced from the lengthwise physical edge 3013 by more than half the length of a minimum dimension (Min) of the minimum candidate size 3016. Any candidate edge segments that do not satisfy the position criteria may eliminated as possible members of the plurality of candidate edges. The position criteria may also be applied to the plurality of lengthwise candidate edge segments, such as lengthwise candidate edge segment 3011 having a proximal end point 3011A and a distal end point 3011B. The proximal end point 3011A may be evaluated according to the position criterion for proximity to the widthwise physical edge 3015 based on the segment to edge distance 3032A.

In further embodiments, the distal end point 3009B of the widthwise candidate edge segment 3009 may be evaluated according to the position criterion for proximity to the lengthwise dimension 3018B of the maximum candidate size 3018 based on the segment to edge distance 3030B. The distal end point 3011B of the lengthwise candidate edge segment may be evaluated according to the position criterion for proximity to the widthwise dimension 3018A of the maximum candidate size 3018 based on the segment to edge distance 3032B. The position criterion as applied to the distal end points 3009B and 3011B may be used instead of or in addition to the position criterion as applied to the proximal end point 3009A and 3011A.

The position criterion expects that if a widthwise candidate edge segment 3009 or a lengthwise candidate edge segment 3011 corresponds to either the widthwise physical edge 3017 or the lengthwise physical edge 3019, either the proximal endpoints 3009A/3009B or the distal endpoints 3011A/3011B would be positioned within a threshold distance of the physical edges or the maximum candidate size of the object. Accordingly, the position criterion evaluates whether a potential candidate edge segment has an endpoint near to a known physical edge or an expected physical edge (as represented by the maximum candidate size) of the object being analyzed. The scaling factor $\delta_1$ may be selected to account for or address noise, sensor discrepancies, or other sources of error in identifying edge segments.

The second criterion, also referred to as a segment length criterion or a segment length threshold, evaluates whether the length of a candidate edge segment exceeds a threshold. In embodiments, the threshold may be set as the length of a minimum dimension (Min) of the minimum candidate size 3016 weighted by a scaling factor $\delta_2$. Accordingly, the length criterion may compare an edge segment length 3051 between the proximal end point 3009A/3011A and the distal endpoint 3009B/3011B to the minimum candidate size 3016. If the edge segment length 3051 of a widthwise candidate edge segment 3009 or a lengthwise candidate edge segment 3011 is smaller than a percentage of the length of the minimum dimension of the minimum candidate size 3016, the computing system 1100/3100 may eliminate the candidate edge segment 3009/3011 from consideration as a candidate edge. The length criterion may also be written as $\delta_2$*Min≤edge Segment Length 3051. The scaling factor $\delta_2$ may have a value in a range between 0.6 and 0.8, between 0.65 and 0.75, between 0.69 and 0.71, or approximately 0.7.

The second criterion expects that, for the candidate edge segment to correspond with a physical edge and therefore be considered as a candidate edge, the candidate edge segment should be long enough to exceed a portion of a minimum dimension of the minimum candidate size. Thus, the candidate edge segments that do not meet the segment length threshold may not be considered as candidates that potentially represent physical edges. The scaling factor $\delta_2$ may be selected to account for or address noise, sensor discrepancies, or other sources of error in identifying edge segments.

The third criterion, also referred to as an orthogonality criterion or a segment orthogonality threshold, evaluates whether the candidate line segments are substantially perpendicular to either the lengthwise physical edge 3013 or the widthwise physical edge 3015. As used herein, the term substantially perpendicular means within 5 degrees of exactly perpendicular. For example, the widthwise candidate edge segment 3009 is compared to the lengthwise physical edge 3013 to determine substantial perpendicularity or substantial orthogonality and the lengthwise candidate edge segment 3011 is compared to the widthwise physical edge 3015 to determine substantial perpendicularity or substantial orthogonality. The third criterion expects that for widthwise line segments 3009 or lengthwise line segments 3011 to correspond with either the widthwise physical edge 3017 or the fourth physical edge 3015 respectively, the potential edge should be substantially perpendicular with the physical edge from which it extends. Candidate edge segments that do not satisfy the orthogonality criterion may be eliminated as potential candidate edges.

The candidate edges may be selected or determined from the plurality of candidate edge segments that satisfy each of the three-criteria: the position criterion, the length criterion, and the orthogonality criterion. The plurality of candidate edges may include a plurality of widthwise candidate edges and a plurality of lengthwise candidate edges. FIG. 3C illustrates an individual widthwise candidate edge 3008 and an individual lengthwise candidate edge 3010. The widthwise candidate edge 3008 is aligned with the associated widthwise candidate edge segment 3009 and extends substantially perpendicularly from the lengthwise physical edge 3013. The lengthwise candidate edge 3010 is aligned with the associated lengthwise candidate edge segment 3011 and extends substantially perpendicularly to the widthwise physical edge 3015.

In an operation, the method 4000 includes an operation 4012 for generating a plurality of intersection points 3024 between respective ones of the plurality of widthwise candidate edges and the plurality of lengthwise candidate edges. An intersection point 3024 is defined as the position where one of any of the plurality of widthwise candidate edges or projections thereof intersect with one of any of the plurality of lengthwise candidate edges or projections thereof. Projections may be used in situations where an identified candidate edge does not extend far enough to intersect with one of the perpendicularly oriented candidate edges. An individual intersection point 3024 between the widthwise candidate edge 3009 and the lengthwise candidate edge 3011 is depicted in FIG. 3C. As depicted in FIG. 3E, each widthwise candidate edge 3008A, 3008B, 3008C and lengthwise candidate edge 3010A, 3010B, 3010C may be associated with a plurality of intersection points 3024A-3024I. For example, widthwise candidate edge 3008A intersects with lengthwise candidate edges 3010A, 3010B, and 3010C to create three distinct intersection points 3024A, 3024D, and 3024G. Each of these intersection points 3024A-3024I represent a potential corner of the target object opposing the target open corner 3004A.

In an operation, the method 4000 includes an operation 4014 of generating a candidate minimum viable region that correlates with the target open corner 3004A. As stated above, the minimum viable region 3006 (shown in FIG. 3C) represents a region on the surface 3001 of the object 3000 associated with the target open corner 3004A that may be or is available to be grabbed or grasped by a robot arm 3320 so as to move the object 3000. In applications where the object 3000 associated in the target open corner 3004A is adjacent to or in contact with other objects, the computing system 3100 may not accurately and/or precisely estimate the dimensions of the object 3000, and, therefore, it is difficult to accurately define a region where the robot arm 3320 may securely grab the object 3000. Therefore, the minimum viable region 3006 defines a region based on estimated or potential dimensions where the robotic arm 3320 may grab the object 3000 without knowing exact dimensions. The minimum viable region 3006 is an area on the surface 3001 of the object 3000 defined by the target open corner 3004A, a widthwise candidate edge 3008 of the plurality of widthwise candidate edge, a lengthwise candidate edge 3010 of the plurality of lengthwise candidate edge, and an intersection point 3024.

As noted above, a plurality of widthwise candidate edges 3008A, 3008B, 3008C, a plurality of lengthwise candidate edges 3010A, 3010B, 3010C, and a plurality of intersection points 3024A-3024I are identified in the previous operations. Together, the plurality of widthwise candidate edges 3008A, 3008B, 3008C, the plurality of lengthwise candidate edges 3010A, 3010B, 3010C, and the plurality of intersection points 3024A-3024I may define a set of potential minimum viable region candidates 3066, individual ones of which (e.g., potential minimum viable region candidates 3006A-3006G) are illustrated in FIG. 3E. In embodiments, a minimum viable region candidate associated with the target corner 3004A may be identified according to an intersection point 3024, as each intersection point 3024 further specifies the widthwise candidate edge 3008 and the lengthwise candidate edge 3010 that it is formed. As depicted in FIG. 3E, numerous potential minimum viable regions 3006 may be associated with a single widthwise candidate edge 3008A, 3008B, 3008C or a single lengthwise candidate edge 3010A, 3010B, 3010C. Additionally, each of the set of potential minimum viable region candidates 3066 is associated with a single intersection point 3024. As discussed above, each of the set of potential minimum viable region candidates 3066 fits within the minimum candidate size 3016 that is associated with a smallest possible object and the maximum candidate size 3018 that is associated with a largest possible object.

The potential minimum viable region candidates 3066 of FIG. 3E are presented in Table 1 below as a combination of widthwise candidate edges 3008A, 3008B 3008C and lengthwise candidate edges 3010A, 3010B, 3010C.

TABLE 1

|       | 3008A | 3008B | 3008C |
|-------|-------|-------|-------|
| 3010A | 3006A | 3006B | 3006C |
| 3010B | 3006D | 3006E | 3006F |
| 3010C | 3006G | 3006H | 3006I |

The candidate minimum viable region 3067 may be chosen from the set of potential minimum viable region candidates 3066 based on the potential minimum viable region candidate 3006A, 3006B, etc., having a smallest diagonal distance between the target corner 3004A and the associated intersection point 3024. The smallest distance may be used as a primary factor in the determination of the candidate minimum viable region 3067. Due to the use of the scaling factor $\delta_2$ for the length criterion, the candidate minimum viable region 3067 may be smaller than the minimum candidate size 3016. In further embodiments, the minimum candidate size 3016 may be set as a minimum size for potential minimum viable region candidates 3066 to be selected as a candidate minimum viable region 3067.

By selecting a smallest diagonal distance for the candidate minimum viable region 3067, the system determines that the candidate minimum viable region 3067 is not larger than the actual object 3000 that it is located on. Although the identified edges that form the candidate minimum viable region 3067 may not represent the actual dimensions of the target object 3000A, they do represent possible edges of the target object 3000A. By selecting the smallest diagonal distance between the target corner 3004A and the associated intersection point 3024, the computing system 1100/3100 determines an area, the candidate minimum viable region 3067, with an increased likelihood of existing on only the target object 3000A. In embodiments, the system may determine that the candidate minimum viable region 3067 does not intersect more than one object. Thus, grasping the target object 3000A within the candidate minimum viable region 3067 increases the reliability of the grasping operation by reducing the possibility that the robot arm attempts to grasp more than one object 3000 at a time.

Various other methods of determining a minimum viable region candidate from the set of potential minimum viable region candidates 3066 may be used. For example, in the event that a potential minimum viable region candidates includes an intersection point 3024 that is also a previously identified open corner 3004, that potential minimum viable region candidate may be selected as it may be assumed to correlate with the entire surface 3001 of the object 3000. Alternatively, if a potential minimum viable region candidate has substantially similar dimensions to either the minimum candidate size 3016 or the maximum candidate size 3018, for example within a certain percentage threshold, it may be assumed that the object 3000 is either the minimum candidate size 3016 or the maximum candidate size 3018, respectively, and the potential minimum viable region candidate may be selected. In some embodiments, the candidate minimum viable region 3067 to be chosen from the set of potential minimum viable region candidates 3066 may be based on the potential minimum viable region candidate 3006A, 3006B, etc., having a largest area or a median area of the set of potential minimum viable region candidates 3066. In some embodiments, the candidate minimum viable region 3067 to be chosen from the set of potential minimum viable region candidates 3066 may be based on the potential minimum viable region candidate 3006A, 3006B, etc., having an intersection point 3024 associated with the shortest candidate edge.

In an operation, the method 4000 includes an operation 4016 of validating or adjusting the minimum viable region candidate 3067 to generate the minimum viable region 3006. Validation of the minimum viable region candidate 3067 may include one or more techniques, as discussed below. The validated and/or adjusted minimum viable region candidate 3067 may thus be defined as the minimum viable region 3006 and may be used by the computing system 1100/3100 as a detection hypothesis or to augment a detection hypothesis for identifying objects. As used herein, the term detection hypothesis refers to a hypothesis about the size or shape of an object as determined by the computing system 1100/3100. In embodiments, detection hypotheses may be confirmed via further analysis (e.g., using additional image analysis techniques), through robotic manipulation, and/or through additional means.

A minimum viable region candidate 3067 may be found for each open corner 3004 identified in operation 4004 (according to the operations 4006-4014), and the minimum viable region candidates 3067 so detected may be validated by comparison to other minimum viable region candidates 3067. For example, the computing system 1100/3100 may perform overlap validation or occlusion validation. The computing system 1100/3100 may determine whether a portion of the minimum viable region candidate 3067 of the target open corner 3004A intersects with a minimum viable region candidate 3067 associated with a different open corner 3004. In such a case, a comparison between the minimum viable region candidate 3067 of the target open corner 3004A and minimum viable region candidate 3067 of the different open corner 3004 may determine that the open corners 3004/3004A belong to the same object 3000A (occlusion validation), or that the open corners 3004/3004A belong to different objects 3000 (overlap validation).

In the case of a shared object, the computing system 1100/3100 may perform the occlusion validation. Two minimum viable region candidates 3067 belonging to the same target object 3004A may occlude one another. The computing system 1100/3100 may combine the information of both minimum viable region candidates 3067 to generate the minimum viable region 3066 or may adjust the minimum viable region candidate 3067 of the target open corner 3004A to incorporate the information of the minimum viable region candidate 3067 of the different open corner 3004 to create a more accurate minimum viable region 3066 for the object 3000A.

Alternatively, in the event that the corners do not belong to the same object 3000, the computing system 1100/3100 may decrease confidence levels associated with the two overlapping minimum viable region candidates 3067. In determining which of the minimum viable region candidates 3067 to designate as the minimum viable region 3006 for further processing, the computing system 1100/3100 may select a minimum viable region candidate 3067 having a highest confidence level (for example, having fewer or no overlaps with other minimum viable region candidates 3067).

In embodiments, the accuracy of the minimum viable region candidates 3067 may further be increased using additional factors. For example, in the event that a pallet is known to contain a uniform type of objects (e.g. objects having a single SKU), the minimum viable regions for each of the objects (and particularly, the minimum viable regions that match with the dimensions of the objects) may be expected to be substantially uniform. In such a case several different techniques may be employed to identify and validate minimum viable region candidates 3067 from the potential minimum viable region candidates 3066. Single SKU or uniform object methods may include one or more of a template verification operation, a packing verification operation, and a corner classification operation.

Referring now to FIG. 3F, in embodiments, for an object repository (e.g., a pallet, container, or other object repository) containing uniform type objects, minimum viable region candidates 3067 may be identified and/or validated from the potential minimum viable region candidates 3066 based on a template verification operation. Aspects of the object recognition methods performed herein are described in greater detail in U.S. application Ser. No. 16/991,510, filed Aug. 12, 2020, and U.S. application Ser. No. 16/991,466, filed Aug. 12, 2020, each of which is incorporated herein by reference. The template verification operation proceeds based on the assumption that uniform objects will have similar dimensions and visual characteristics. Portions of the image information defined by the potential minimum viable region candidates 3066 may be analyzed to generate templates 3068 corresponding to each of the potential minimum viable region candidates 3066. Each template 3068 may include information generated from the associated image portion, including at least a textured value, a color value, and a dimension value. The textured value may define whether the image portion of the potential minimum viable region candidate 3066 identifies a textured or textureless surface. The color value may define the color of the image portion representing the potential minimum viable region candidate 3066. The dimension value may represent the edge dimensions and/or area of the potential minimum viable region candidate 3066. The templates 3068 may be compared with one another to identify templates 3068 that match in one or more of the textured value, the color value, and the dimension value. Matching in one or more of these values may indicate that the potential minimum viable region candidates 3066 associated with the matching templates 3068 represent true physical objects 3000. Where the objects 3000 are of a uniform type, it may be expected that they have matching templates 3068. Thus, by identifying matching templates 3068, one or more minimum viable region candidates 3067 may be identified from the potential minimum viable region candidates 3066. In embodiments, the identified one or more minimum viable region candidates 3067 may further be validated as minimum viable regions 3006 based on the template verification operation.

Figure 3H:
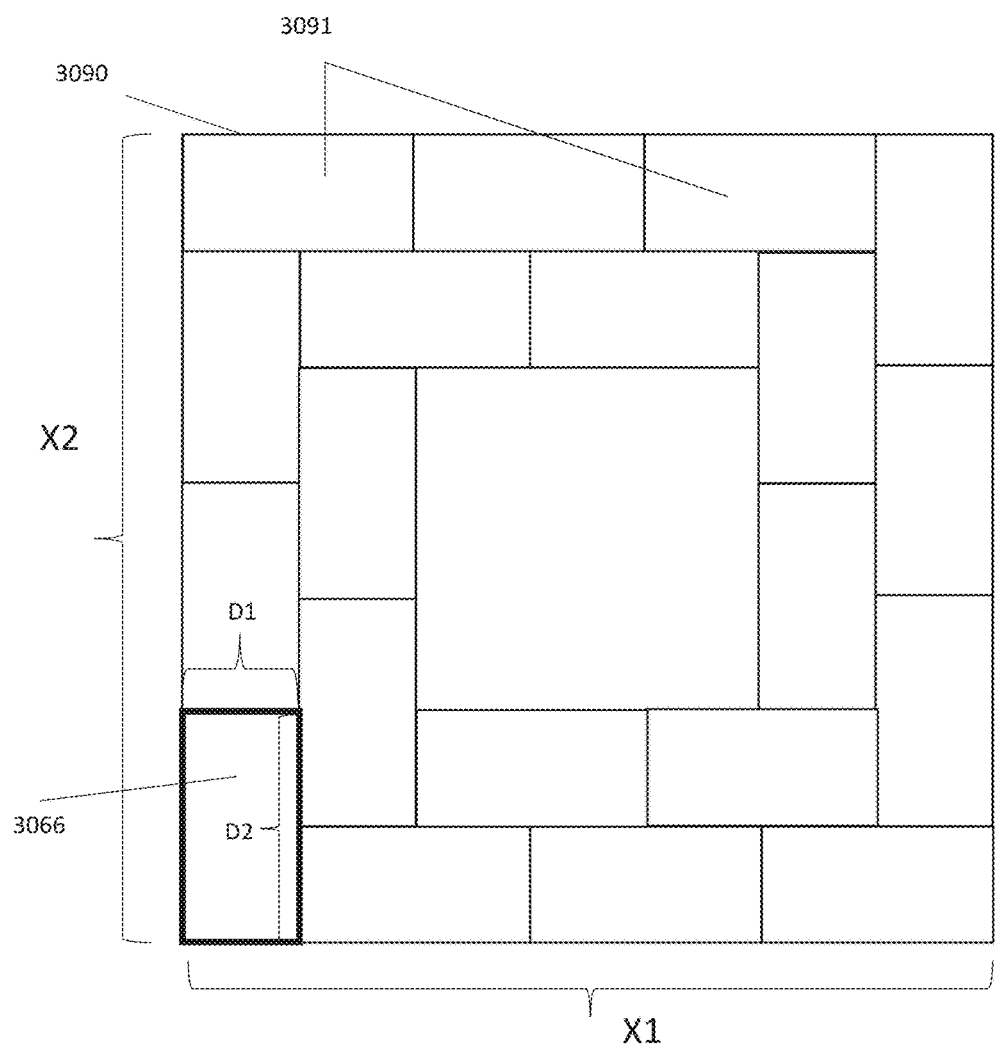

Referring now to FIGS. 3G and 3H, in embodiments, for an object repository 3090 (e.g., a pallet, container, or other object repository) containing uniform type objects 3091, minimum viable region candidates 3067 (not shown here) may be identified and/or validated from the potential minimum viable region candidates 3066 based on a packing verification operation. If it is known that the object repository 3090 is fully packed (e.g., having a layer completely occupied by objects) or it is known that the object repository is packed around the edges, this information may be used to assist or augment the identification and validation of minimum viable region candidates 3067 from the potential minimum viable region candidates 3066 in several ways.

First, the packing verification operation may use the total area of the packed object repository 3090 to assist in the identification and validation of minimum viable region candidates 3067. If the object repository 3090 is fully packed, the total surface area of the objects 3091 located thereon will be evenly divisible by the surface area of a single object 3091. In the example shown in FIG. 3G, the total surface area of the objects 3091 divided by the surface area of a single object 3091 is eight. The areas of the potential minimum viable region candidates 3066 may be compared to the total surface area of the objects 3091 to identify minimum viable region candidates 3067 with areas that evenly divide into the total surface area. A threshold factor (e.g., 95%, 98%, 99%, etc.) may be applied to the division operation to account for noise and other sources of measurement error. The identified minimum viable region candidates 3067 may be further validated to determine minimum viable regions 3006 according to further methods described herein.

Second, the packing verification operation may use the dimensions of the packed object repository 3090 to assist in the identification and validation of minimum viable region candidates 3067. In a specific arrangement wherein the objects 3091 are arranged in equal numbers of rows and columns, the dimensions of the potential minimum viable region candidates 3066 may be compared to the dimensions of object repository 3090 to identify and/or validate minimum viable region candidates 3067. For example, the widthwise dimension X1 and the lengthwise dimension X2 of the object repository 3090 will be evenly divisible by dimensions of potential minimum viable region candidates 3066 that match the dimensions of the objects 3091, A potential minimum viable region candidate 3066 is shown in FIG. 3G with a darkened border, having the dimensions D1 and D2. If $X1=m*D1$, where m is an integer (in the example of FIG. 3G, m=2) and $X2=n*D2$, where n is an integer (in the example of FIG. 3G, n=4), it may indicate that the potential minimum viable region candidate 3066 represents the true dimensions of an object 3091 on the object repository 3090 and may be identified as a minimum viable region candidate 3067. If the dimensions of a potential minimum viable region candidate 3066 do not satisfy these conditions, it is unlikely to represent the true dimensions of an object 3091 on the object repository 3090. In embodiments, a percentage threshold (e.g., 95%, 98%, 99%) may be used in the equations for X1 and X2 to account for potential errors in measurement due to noise and other factors. The identified minimum viable region candidates 3067 may be further validated to determine minimum viable regions 3006 according to further methods described herein.

Third, the packing verification operation may use the dimensions of the object repository 3090 to assist in the identification and validation of minimum viable region candidates 3067 for more general arrangements. In a general arrangement, shown in FIG. 3H, wherein the objects 3091 are arranged in unequal numbers of rows and columns (sometimes referred to as a pinwheel pattern) that completely pack the edges of the object repository 3090, the length of each side of the object repository 3090 should be equal to an integer number of a widthwise dimension of the objects 3091 plus an integer number of a lengthwise dimension of the objects 3091. The general arrangement packing operation may be used whether the object repository 3090 is fully packed or not, as long as the edges are fully packed. The dimensions of the potential minimum viable region candidates 3066 may be compared to the dimensions of object repository 3090 to identify and/or validate minimum viable region candidates 3067 using a pair of equations that accounts for both the width and length of the objects 3091. A potential minimum viable region candidate 3066 is shown in FIG. 3H with a darkened border, having the dimensions D1 and D2. In the general arrangement, the equations that should be satisfied are as follows. $X1=m1*D1+n1*D2$, where m1 and n1 are both integers (in the example of FIG. 3H, m1=1 and n1=3) and $X2=m2*D1+n2*D2$, where m2 and n2 are both integers (in the example of FIG. 3H, m2=1 and n2=3). If both equations can be satisfied by the dimensions of a potential minimum viable region candidate 3066, it may indicate that the potential minimum viable region candidate 3066 represents the true dimensions of an object 3091 on the object repository 3090 and may be identified as a minimum viable region candidate 3067. If the dimensions of a potential minimum viable region candidate 3066 do not satisfy these conditions, it is unlikely to represent the true dimensions of an object 3091 on the object repository 3090. In embodiments, a percentage threshold (e.g., 95%, 98%, 99%) may be used in the equations for X1 and X2 to account for potential errors in measurement due to noise and other factors. The identified minimum viable region candidates 3067 may be further validated to determine minimum viable regions 3006 according to further methods described herein.

In embodiments, a corner classification operation may be carried out by the computing system 1100/3100 on an object repository 3090 having objects 3091 of uniform type. Because the objects 3091 are uniform, it will be expected that the objects 3091 identifiable at the open corners may have some features in common. For example, corner types of the objects 3091 may be compared between corners of the object repository 3090. Corner types may include, for example, rectangular, octagonal, and rounded. In some situations, due to measurement error, it may be difficult to distinguish between the different types of object corners at the corners of the object repository 3090. For example, it may be difficult to determine whether an object corner is octagonal or rounded. In such cases, the object corners at each corner of the object repository 3090 may be compared and, the object corner identified most frequently may be determined as the object corner type of the objects 3091 in the object repository 3090. Similar techniques may be used to determine a textured or textureless classification of the objects 3900 located at the corners of the object repository 3900.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

Further embodiments include:

Embodiment 1 is a computing system comprising a non-transitory computer-readable medium; at least one processing circuit in communication with a camera having a field of view and configured, when one or more objects are or have been in the field of view, to execute instructions stored on the non-transitory computer-readable medium for: obtaining image information representing one or objects, each object having a plurality of edges, wherein the image information is generated by the camera and describes at least an object appearance associated with the one or more objects; detecting a plurality of corners of the one or more objects based on the image information; identifying a target open corner from the plurality of corners; defining a minimum viable region for the target open corner, wherein the minimum viable region is defined by: generating a plurality of candidate edge segments; determining a plurality of candidate edges from the plurality of candidate edge segments; defining a plurality of intersection points between respective ones of the plurality of candidate edges; defining a set of potential minimum viable region candidates based on the plurality of intersection points; and selecting a minimum viable region candidate for the target open corner of the plurality of corners from the set of potential minimum viable region candidates; and validating the minimum viable region candidate as a minimum viable region for the target open corner.

Embodiment 2 is the computing system of embodiment 1, wherein the image information is warped from a three-dimensional view to a two-dimensional view.

Embodiment 3 is the computing system of embodiment 1 or 2, wherein generating the plurality of edge segments includes generating the plurality of edge segments within a region defined by a minimum candidate size and a maximum candidate size.

Embodiment 4 is the computing system of embodiments 1-3, wherein the minimum viable region candidate is selected from the set of potential minimum viable region candidates based on smallest area.

Embodiment 5 is the computing system of embodiments 1-4, wherein identifying the target open corner includes recognizing that the selected open corner is not adjacent to another object.

Embodiment 6 is the computing system of embodiments 1-5, wherein validating the minimum viable region candidate as a minimum viable region includes performing overlap validation of the minimum viable region candidate against the at least one other minimum viable region candidate.

Embodiment 7 is the computing system of embodiments 1-6, wherein determining the plurality of candidate edges from the plurality of candidate edge segments includes evaluating the plurality of candidate edge segments according to a segment length criterion.

Embodiment 8 is the computing system of embodiments 1-7, wherein determining the plurality of candidate edges from the plurality of candidate edge segments includes evaluating the plurality of candidate edge segments according to an orthogonality criterion.

Embodiment 9 is the computing system of embodiments 1-8, wherein determining the plurality of candidate edges from the plurality of candidate edge segments includes evaluating the plurality of candidate edge segments according to a position criterion.

Embodiment 10 is the computing system of embodiments 1-9, wherein validating the minimum viable region candidate is performed according to a packing verification operation.

Embodiment 11 is a method of controlling a robotic system comprising a non-transitory computer-readable medium, at least one processing circuit in communication with a camera having a field of view and configured to execute instructions. The method comprises obtaining image information representing one or objects, each object having a plurality of edges, wherein the image information is generated by the camera and describes at least an object appearance associated with the one or more objects; detecting a plurality of corners of the one or more objects based on the image information; identifying a target open corner from the plurality of corners; defining a minimum viable region for the target open corner, wherein the minimum viable region is defined by: generating a plurality of candidate edge segments; determining a plurality of candidate edges from the plurality of candidate edge segments; defining a plurality of intersection points between respective ones of the plurality of candidate edges; defining a set of potential minimum viable region candidates based on the plurality of intersection points; and selecting a minimum viable region candidate for the target open corner of the plurality of corners from the set of potential minimum viable region candidates; and validating the minimum viable region candidate as a minimum viable region for the target open corner.

Embodiment 12 is the method of embodiment 11, wherein generating the plurality of edge segments includes generating the plurality of edge segments within a region defined by a minimum candidate size and a maximum candidate size.

Embodiment 13 is the method of embodiments 11 or 12, wherein the minimum viable region candidate is selected from the set of potential minimum viable region candidates based on smallest area.

Embodiment 14 is the method of embodiments 11-13, wherein identifying the target open corner includes recognizing that the selected open corner is not adjacent to another object.

Embodiment 15 is the method of embodiments 11-14, validating the minimum viable region candidate as a minimum viable region includes performing overlap validation of the minimum viable region candidate against the at least one other minimum viable region candidate.

Embodiment 16 is the method of embodiments 11-15, wherein determining the plurality of candidate edges from the plurality of candidate edge segments includes evaluating the plurality of candidate edge segments according to a segment length criterion.

Embodiment 17 is the method of embodiments 11-16, wherein determining the plurality of candidate edges from the plurality of candidate edge segments includes evaluating the plurality of candidate edge segments according to an orthogonality criterion.

Embodiment 18 is the method of embodiments 11-17, wherein determining the plurality of candidate edges from the plurality of candidate edge segments includes evaluating the plurality of candidate edge segments according to a position criterion.

Embodiment 19 is the method of embodiments 11-18, wherein validating the minimum viable region candidate is performed according to a packing verification operation.

Embodiment 20 is a non-transitory computer-readable medium including instructions for execution by at least one processing circuit in communication with a camera having a field of view and configured, when one or more objects are or have been in the field of view, the instructions being configured for: obtaining image information representing one or objects, each object having a plurality of edges, wherein the image information is generated by the camera and describes at least an object appearance associated with the one or more objects; detecting a plurality of corners of the one or more objects based on the image information; identifying a target open corner from the plurality of corners; defining a minimum viable region for the target open corner, wherein the minimum viable region is defined by: generating a plurality of candidate edge segments; determining a plurality of candidate edges from the plurality of candidate edge segments; defining a plurality of intersection points between respective ones of the plurality of candidate edges; defining a set of potential minimum viable region candidates based on the plurality of intersection points; and selecting a minimum viable region candidate for the target open corner of the plurality of corners from the set of potential minimum viable region candidates; and validating the minimum viable region candidate as a minimum viable region for the target open corner.

The invention claimed is:
1. A computing system comprising:
a non-transitory computer-readable medium;
at least one processing circuit in communication with a camera having a field of view and configured, when one or more objects are or have been in the field of view, to execute instructions stored on the non-transitory computer-readable medium for:
  obtaining image information representing one or objects, each object having a plurality of edges, wherein the image information is generated by the camera and describes at least an object appearance associated with the one or more objects;
  detecting a plurality of corners of the one or more objects based on the image information;
  identifying a target open corner from the plurality of corners;
  defining a minimum viable region for the target open corner, wherein the minimum viable region is defined by:
    generating a plurality of candidate edge segments;
    determining a plurality of candidate edges from the plurality of candidate edge segments;
    defining a plurality of intersection points between respective ones of the plurality of candidate edges;
    defining a set of potential minimum viable region candidates based on the plurality of intersection points;
    selecting a minimum viable region candidate for the target open corner of the plurality of corners from the set of potential minimum viable region candidates; and
    validating the minimum viable region candidate as a minimum viable region for the target open corner.

2. The computing system of claim 1, wherein the image information is warped from a three-dimensional view to a two-dimensional view.

3. The computing system of claim 1, wherein generating the plurality of edge segments includes generating the plurality of edge segments within a region defined by a minimum candidate size and a maximum candidate size.

4. The computing system of claim 1, wherein the minimum viable region candidate is selected from the set of potential minimum viable region candidates based on smallest area.

5. The computing system of claim 1, wherein identifying the target open corner includes recognizing that the selected open corner is not adjacent to another object.

6. The computing system of claim 1, wherein validating the minimum viable region candidate as a minimum viable region includes performing overlap validation of the minimum viable region candidate against the at least one other minimum viable region candidate.

7. The computing system of claim 1, wherein determining the plurality of candidate edges from the plurality of candidate edge segments includes evaluating the plurality of candidate edge segments according to a segment length criterion.

8. The computing system of claim 1, wherein determining the plurality of candidate edges from the plurality of candidate edge segments includes evaluating the plurality of candidate edge segments according to an orthogonality criterion.

9. The computing system of claim 1, wherein determining the plurality of candidate edges from the plurality of candidate edge segments includes evaluating the plurality of candidate edge segments according to a position criterion.

10. The computing system of claim 1, wherein validating the minimum viable region candidate is performed according to a packing verification operation.

11. A method of controlling a robotic system comprising a non-transitory computer-readable medium, at least one processing circuit in communication with a camera having a field of view and configured to execute instructions, the method comprising:
- obtaining image information representing one or objects, each object having a plurality of edges, wherein the image information is generated by the camera and describes at least an object appearance associated with the one or more objects;
- detecting a plurality of corners of the one or more objects based on the image information;
- identifying a target open corner from the plurality of corners;
- defining a minimum viable region for the target open corner, wherein the minimum viable region is defined by:
  - generating a plurality of candidate edge segments;
  - determining a plurality of candidate edges from the plurality of candidate edge segments;
  - defining a plurality of intersection points between respective ones of the plurality of candidate edges;
  - defining a set of potential minimum viable region candidates based on the plurality of intersection points;
  - selecting a minimum viable region candidate for the target open corner of the plurality of corners from the set of potential minimum viable region candidates; and
  - validating the minimum viable region candidate as a minimum viable region for the target open corner.

12. The method of claim 11, wherein generating the plurality of edge segments includes generating the plurality of edge segments within a region defined by a minimum candidate size and a maximum candidate size.

13. The method of claim 11, wherein the minimum viable region candidate is selected from the set of potential minimum viable region candidates based on smallest area.

14. The method of claim 11, wherein identifying the target open corner includes recognizing that the selected open corner is not adjacent to another object.

15. The method of claim 11, wherein validating the minimum viable region candidate as a minimum viable region includes performing overlap validation of the minimum viable region candidate against the at least one other minimum viable region candidate.

16. The method of claim 11, wherein determining the plurality of candidate edges from the plurality of candidate edge segments includes evaluating the plurality of candidate edge segments according to a segment length criterion.

17. The method of claim 11, wherein determining the plurality of candidate edges from the plurality of candidate edge segments includes evaluating the plurality of candidate edge segments according to an orthogonality criterion.

18. The method of claim 11, wherein determining the plurality of candidate edges from the plurality of candidate edge segments includes evaluating the plurality of candidate edge segments according to a position criterion.

19. The method of claim 11, wherein validating the minimum viable region candidate is performed according to a packing verification operation.

20. A non-transitory computer-readable medium including instructions for execution by at least one processing circuit in communication with a camera having a field of view and configured, when one or more objects are or have been in the field of view, the instructions being configured for:
- obtaining image information representing one or objects, each object having a plurality of edges, wherein the image information is generated by the camera and describes at least an object appearance associated with the one or more objects;
- detecting a plurality of corners of the one or more objects based on the image information;
- identifying a target open corner from the plurality of corners;
- defining a minimum viable region for the target open corner, wherein the minimum viable region is defined by:
  - generating a plurality of candidate edge segments;
  - determining a plurality of candidate edges from the plurality of candidate edge segments;
  - defining a plurality of intersection points between respective ones of the plurality of candidate edges;
  - defining a set of potential minimum viable region candidates based on the plurality of intersection points; and
  - selecting a minimum viable region candidate for the target open corner of the plurality of corners from the set of potential minimum viable region candidates;
- validating the minimum viable region candidate as a minimum viable region for the target open corner.

* * * * *